United States Patent [19]
Ward

[11] Patent Number: 4,805,093
[45] Date of Patent: Feb. 14, 1989

[54] CONTENT ADDRESSABLE MEMORY

[76] Inventor: Calvin B. Ward, 9580 Crow Canyon Rd., Castro Valley, Calif. 94552

[21] Appl. No.: 918,766

[22] Filed: Oct. 14, 1986

[51] Int. Cl.$^4$ .................................................. G06F 12/00
[52] U.S. Cl. ................................................................ 364/200
[58] Field of Search ... 364/200 MS File, 900 MS File

[56] References Cited

U.S. PATENT DOCUMENTS

| | | | |
|---|---|---|---|
| 3,387,274 | 6/1968 | Davis | 364/200 |
| 3,699,533 | 10/1972 | Hunter | 364/200 |
| 3,742,460 | 6/1973 | Englund | 364/200 |
| 3,771,139 | 11/1973 | Digby | 364/200 |
| 3,906,455 | 9/1975 | Houston et al. | |
| 4,027,208 | 5/1977 | Barton et al. | |
| 4,053,871 | 10/1977 | Vidalin et al. | |
| 4,096,568 | 6/1978 | Bennett | 364/200 |
| 4,099,242 | 7/1978 | Houston | 364/200 |
| 4,118,788 | 10/1978 | Roberts | |
| 4,128,882 | 12/1978 | Dennis | 364/200 |
| 4,267,582 | 5/1981 | Thomanck | 364/900 |
| 4,283,771 | 8/1981 | Hsu Chang | |
| 4,363,095 | 12/1982 | Woods | 364/200 |
| 4,390,945 | 6/1983 | Olson et al. | |
| 4,420,817 | 12/1983 | Yoshida | 364/900 |
| 4,450,520 | 5/1984 | Hollaar | 364/200 |
| 4,451,901 | 5/1984 | Wolfe et al. | |
| 4,499,553 | 2/1985 | Dickinson et al. | |
| 4,527,253 | 7/1985 | Sato et al. | |
| 4,554,631 | 11/1985 | Reddington | |

Primary Examiner—Gareth D. Shaw
Assistant Examiner—Rebecca L. Adams
Attorney, Agent, or Firm—Fitch, Even, Tabin & Flannery

[57] ABSTRACT

A content addressable memory for storing data words wherein each data word includes one or more characters is disclosed. One or more of the characters stored in said content addressable memory may be retrieved in response to commands from a controller coupled to the content addressable memory. The controller includes command generating circuitry for generating and coupling a plurality of control signals to the content addressable memory, including control signals defining a specification character. The controller also contains response circuitry for receiving a plurality of response signals from the content addressable memory. These response signals include signals specifying a character stored in the content addressable memory. The content addressable memory is constructed from a plurality of storage sections. Each storage section includes control bus coupling circuitry for coupling that storage section to the controller and to the other storage sections. Each storage section also includes circuitry for storing one data word and circuitry for separately selecting each character of the data word so stored. Each storage section may be in one of two states, active or inactive, specified by circuitry contained therein. Each storage section also includes processing circuitry for processing the selected character in response to the control signals. The processing employed is specified by on the control signals, the selected character, the state of the storage section, the specification character, and whether or not the storage section is the first active storage section.

55 Claims, 16 Drawing Sheets

CONTENT ADDRESSABLE MEMORY

BACKGROUND OF THE INVENTION

The present invention relates generally to memory systems for use in computers and, more specifically, to content addressable memory systems.

Modern computers are remarkably similar to the original Von Neumann designs. The computer is typically divided into a memory system for storing data and instructions and a central processing unit which is responsible for carrying out the instruction in question using the data stored in the memory. The memory is typically organized into storage slots each having a fixed number of bits. Data is stored in a selected storage slot by specifying the data bits and the location of the selected storage slot with reference to the location of the first storage slot in the memory. The location of a storage slot specified in this manner is normally referred to as the address of the storage slot. For the purposes of this discussion, the contents of one such storage slot will be referred to as a character.

As a result of the address method of specifying data stored in the memory, a typical central processing unit has a maximum efficient size for directly addressable memory. The instructions executed by the central processing unit include information specifying the addresses of the data to be used with those instructions. A central processing unit designed to address a large memory must allocate more bits for the address portion of each instruction than a central processing unit designed to address a small memory, or it must use some form of indirect addressing which introduces "overhead" calculations which reduce efficiency. That is, the number of bits of information that must be stored for each instruction is greater in a large memory system computer than in a small memory system computer. This requires additional memory space to store these instructions and additional hardware in the central processing unit to process the larger instructions. Hence, the efficiency of a Von Neumann system will, in general, decrease with increasing memory size beyond the above mentioned maximum efficient memory size. The additional hardware needed for calculating extended addresses does not perform any additional programmed calculations when a given problem is being processed by the computer. Unfortunately, artifical intelligence applications of computers often require very large memory systems; hence, Von Neumann designs are not well suited to such applications.

There is also a limit to the speed at which a Von Neumann computer can run. In spite of the enormous improvements made in the speed of such computers, there is still a large class of problems, particularly in the artifical intelligence area, which require more calculations per unit time than can be carried out on even the fastest Von Neumann computer. This limitation results from the inability of the central processing unit to process more than one instruction at a time.

As a result of these limitations, a number of authors have suggested various forms of concurrent computer architectures to replace, or at least augment, the classical Von Neumann design. In a concurrent computer, the computer program is broken into a number of tasks which are given to each of a plurality of different central processing units to carry out. The various central processing units often have their own memory systems. The central processing units run simultaneously. In a system with N central processing units, the potential throughput of the system is N times that of a single central processing unit. Hence, to the extent that this potential can be realized, a concurrent computer can avoid the speed limitations of the classical Von Neumann design.

The extent to which the theoretical increase in speed of a given concurrent computer may be realized, however, depends upon the extent to which the programmer can break the problem to be solved by the computer into sub-tasks which may be run simultaneously. The types of programs which lend themselves best to this approach are those which can be broken into a number of identical tasks performed on different sets of data. Ideally, the tasks should be capable of being performed without the need to have the results from one of the tasks before proceeding to the next task. If this is not the case, one or more of the central processing units may be idled waiting for the results in question.

It should be noted, however, that even when a substantial increase in speed is obtained by this approach, there may actually be a decrease in the efficiency of the computer as measured in terms of the cost per calculation. At best, the efficiency of the multi-processor system is the same as that of the individual central processing units. In general, it will be less, since additional overhead calculations must be performed to coordinate the actions of the various central processing units. Furthermore, it is difficult to keep all of the central processing units busy all of the time; hence, inefficiencies resulting from idle central processing units are also present.

To obtain a substantial improvement in system efficiency, a central processing unit having a substantially reduced instruction set must, in general, be used. The efficiency of a central processing unit is related to the area of silicon needed to fabricate it. Larger area central processing units are more expensive to fabricate than smaller central processing units. Hence, to reduce the cost of the central processing unit, either the silicon area must be reduced or the utilization of the silicon area must be improved. Since the number of different instructions which a given central processing unit can execute is related to the silicon area, a reduction in area requires a reduction in the number of different instructions executable by the central processing unit. Hence, unless the efficiency of utilization of silicon can be increased, an increase in central processor efficiency requires a decrease in the size of the instruction set.

Hence, to obtain both a substantial improvement in speed and cost per computation using a concurrent computer architecture, the problems which this architecture is designed to solve must be divisible into sub-tasks which can each be executed concurrently by a plurality of central processing units. And, the central processors must each be optimized so as to be able to execute only those instructions that are necessary to solve the problem. Such reduced instruction set central processing units will be referred to hereinafter as processing units. For reasons of practicality, such processing units are usually all identical in a given concurrent computer.

One type of problem which satisfies these constraints is that of finding an entry in a table of similar entries. For the purpose of this discussion, each entry will be assumed to be a word in the English language. Each entry in the table consists of a word followed by data specifying where additional information about that word may be found. This data will be referred to as a pointer, since, in general, the data in question specifies an address in the computer's memory at which a contiguous block of characters starts which specifies the additional information. In the general table look-up problem, one wishes to find one or more entries in the table having words which satisfy a specification, referred to as a specification word, and then to return the table entries found, including the word and pointer for each such entry. This specification is referred to as a specification word, because it usually consists of a sequence of characters which are to match a corresponding sequence of characters, referred to as a field, in the word stored in each table entry. For example, a request could be made for all entries in which the word begins with the sequence of characters "nat".

This type of table look-up task occurs frequently in computer programs which must deal with English or some other human readable language. For example, most computers accept commands consisting of English words. A command, typically, begins with a verb which specifies that a particular program stored in the computer's memory is to be run. Each time the computer receives a word which may be a verb of this type, the program must compare the received word with each of the words in a command word table. If the received word matches one of these command words, control is transferred to the instruction located at a memory location specified in the pointer associated with the command word.

Similarly, text processing programs are often required to check the spelling of the words in a document. This can be accomplished by comparing each word in the document to a list of words, referred to as a dictionary. If the word is found in the dictionary, it is correctly spelled. The remaining words not found in the dictionary are then collected in a list for an operator to review to determine if they are misspelled.

Several authors have proposed concurrent computer architectures for carrying out this type of table look-up. These computers are often referred to as content addressable memories, since they are peripheral devices connected to a host data processing system which retrieve data records based on the content of the data record rather than the address at which a data word is located in the computer's memory.

An ideal content addressable memory has three properties. First, it should retrieve the first desired character of the first data word in a time approximately equal to that required to transfer the specification word to the content addressable memory. In general, the host data processing system can only transfer words one character at a time. Hence, the minimum time needed to find all data words stored in the content addressable memory which match a particular specification word is the time needed to transfer the specification word in question. No substantial improvements in the efficiency of the overall system can be achieved by constructing a content addressable memory which responds faster than the host data processing system can use the results.

Second, the efficiency of the content addressable memory and host data processing system should not be dependent on the size of the content addressable memory as measured by the number of data words stored therein. This property is often referred to as the ability to scale the content addressable memory. If the size of the content addressable memory were, for example, doubled, no increase in the time needed to select and retrieve a data word having a field which matches the specification word should be encountered. Similarly, the host data processing system should not have to be reprogrammed if the size of the content addressable memory is increased. Ideally, the host data processing system should not need to know the size of the content addressable memory.

Finally, the amount of circuitry in the content addressable memory that is devoted to matching the data words against the specification word, i.e., the amount of circuitry in the content addressable memory processing units, should be small compared to the amount of circuitry devoted to storing data words. Since the data words in question must be stored somewhere, the minimum size of the content addressable memory would be the space needed to store the data words. Once the space needed to construct the processing units is made small compared to this space, no substantial improvements in overall system efficiency, as measured by cost per computation, can be made.

Prior art content addressable memories have failed to meet these ideals. The circuitry used to implement the processing units in prior art designs has been a substantial fraction of the circuitry needed to store a single data word. As a result, the third goal could only be met by multiplexing this processing unit circuitry between several data words. This strategy results in a content addressable memory in which the time required to retrieve the first data word having a specified field which matches the specification word is much longer than the time needed to transfer the specification word to the content addressable memory.

The time needed to compare one character of the specification word with the corresponding character in one data word is approximately the same as the time needed to transfer the specification word character in question to the content addressable memory. Hence, if each processing unit must service N data words, the time needed to compare one character of the specification word with each corresponding character of the stored data words will be N times the time needed to transfer the specification word character to the content addressable memory. Hence, prior art systems have been a compromise in which the first and third ideals mentioned above are traded off against one another.

Because of the limitations of current VLSI circuit fabrication techniques, many useful applications for a content addressable memory require so large a memory that the content addressable memory must be constructed on more than one circuit chip. During operations in which a data word is either read out of, or written into, the content addressable memory, only one such chip can be operative. Typically, the active chip in prior art content addressable memories has been specified by the host data processing system using chip select lines. That is, each chip has an input pin which enables it for operation when an appropriate signal is applied thereto. When, for example, a read operation is performed, the host data processing system selects one of the chips to be active and de-activates the remaining chips by an appropriate signal on the chip select lines of these chips. This requires that the host data processing system be able to "address" the various chips.

This addressing operation has all of the limitations and problem associated with a central processing unit addressing its memory. It requires that a fixed number of address lines be run between the central processing unit and the memory and that the central processing unit execute additional software to scan through the content addressable memory by sequentially selecting the appropriate address line. If one expands the content addressable memory beyond the capacity of the address lines originally designed into the system, additional hardware and software must be introduced into the system which usually results in a decrease in operating efficiency, since the additional software increases the "computational overhead" of the system. That is, the additional content addressable memory chips require the central processing unit to perform additional calculations which do not produce any useful output.

Broadly, it is an object of the present invention to provide an improved content addressable memory system.

It is also an object of the present invention to provide a content addressable memory which can retrieve each data word having a specified field which matches the specification word in a time substantially equal to the time needed to transfer the specification word to the content addressable memory.

It is another object of the present invention to provide a content addressable memory in which the amount of circuitry devoted to processing units is small compared to the total circuitry in the content addressable memory.

It is yet another object of the present invention to provide a content addressable memory which can be increased in size indefinitely without changing either the host data processing system hardware or software used to operate said content addressable memory.

These and other objects of the present invention will become apparent from the following detailed description of the present invention and the accompanying drawings.

SUMMARY OF THE INVENTION

The present invention consists of a content addressable memory for storing data words wherein each data word includes one or more characters. Each character has a predetermined number of bits, W. One or more of the characters stored in said content addressable memory may also be retrieved in response to commands from a controller coupled to said content addressable memory. The controller includes command circuitry for generating and coupling a plurality of control signals to the content addressable memory, including control signals defining a specification character The controller also contains response circuitry for receiving a plurality of response signals from the content addressable memory. These response signals include signals specifying a character stored in the content addressable memory. The content addressable memory is constructed from a plurality of storage sections.

Each storage section includes control bus coupling circuitry for coupling that storage section to the controller and to the other storage sections. This circuitry includes circuitry for coupling the specification character, the response signals, and the control signals from the controller to each of the storage sections Each storage section also includes circuitry for storing one data word nd circuitry for separately selecting each character of the data word so stored. At any given time, one such character is selected. Each storage section may be in one of two states, active or inactive, specified by circuitry contained therein. This circuitry includes circuitry for determining if the storage section is the first active storage section. The first active storage section is defined to be the closest storage section in the active state to the beginning of said linear array.

Each storage section also includes processing circuitry for processing the selected character in response to the control signals The processing employed is specified by one of control signals, the selected character, the state of the storage section, the specification character, and whether or not the storage section is the first active storage section. The processing circuitry includes circuitry for causing the state specifying circuitry to specify the active state for the storage section in response to a predetermined control signal The processing circuitry also includes circuitry for causing the state specifying circuitry to specify the inactive state for the storage section in response to a predetermined control signal, and the relationship of the selected character to the specification character. The relationship in question is preferably a mismatch between the selected character and the specification character or a specific mathematical relationship between the numbers represented by the characters in question.

DETAILED DESCRIPTION OF THE INVENTION

1. System Overview

Figure 1:
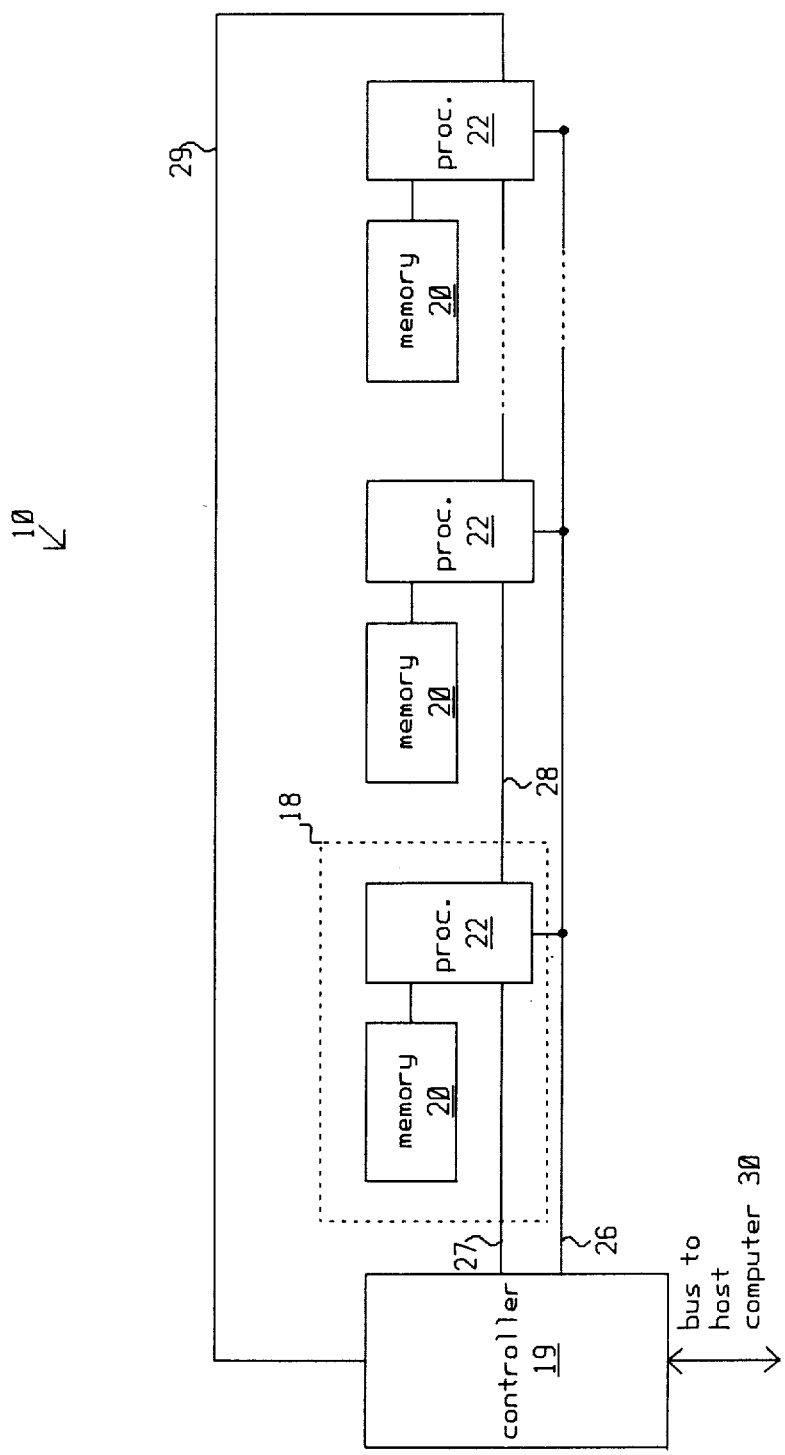
FIG. 1 is a block diagram of a content addressable memory according to the present invention.

A block diagram of a content addressable memory according to the present invention is shown at 10 in FIG. 1. It includes a plurality of storage sections arranged in a linear array. Each storage section is used to store and process one data word. A typical storage section is shown at 18. It includes a memory 20 and a processor 22. A data word is stored in the memory 20. Processor 22 performs a number of operations on the data word stored in the memory 20 connected to it in response to signals on bus 26 which is used to broadcast a plurality of control signals to all of the storage sections 18 simultaneously.

These control signals are generated by a controller 19 which is coupled to a host data processing system by a second bus 30. The controller 19 decodes instructions from the host data processing system into control signals which are placed on bus 26. From the following discussion, it will be apparent to those skilled in the art that the functions performed by the controller 19 could also be performed directly by the host data processing system. A controller is preferred only because it relieves the host data processing system of these decoding tasks.

Each processor 22 is coupled to processors in adjacent storage sections 18 by a select line 28 which is used to enable processing operations which are directed to only one of the processors 22. The processor 22 in the first storage section of the linear array of storage sections is connected to the controller by a conductor 27. The processor 22 in the last storage section in the linear array of storage sections is also connected to the controller, by a conductor 29. The controller 19 places a signal on conductor 27 and senses the presence of this signal on conductor 29. The uses of these signals will be explained in detail below.

In contrast to prior art concurrent processing systems, the processors 22 do not have permanent labels used to address each specific processor. For example, the controller 19 does not send an instruction to a processor in a storage section by sending an instruction which contains the location of the processor in question relative to the beginning of the linear array of storage sections Instead, the processors are grouped into classes, and instructions are directed to all members of a class. The instructions are then simultaneously executed by all members of the class in question. The class assigned to a given storage section at any particular time depends on the data word stored in the memory 20 of said storage section 18 and the previous instructions executed by the processor 22 in the storage section 18 in question. As a result, any given storage section may be in any one of the possible classes at any time. The class assigned to a given storage section depends on a state variable defined for that storage section and upon the relationship of the storage section in question to other storage sections having the state variable in question More specifically, each storage section 18 may be in one of two states, referred to as active and inactive. In the preferred embodiment of the present invention, three classes of processors are possible. The first class consists of all of the storage sections 18. The second class consists of those storage sections 18 in the active state. The third class consists of the storage section 18 in the active state which is closest to the controller 19, if such a processor exists. This storage section is referred to as the first active storage section. This is the storage section which would be first to receive a signal placed on line 27. It should be noted that there is at most one such storage section.

Each of the processors 22 executes a plurality of instructions which may be broadly divided into three classes of instructions. The first class of instructions is directed to all processors. For example, one of the instructions implemented in the preferred embodiment of the present invention causes all processors 22 to enter the active state. A second instruction of this type selects a character of a data word stored in each memory 20 for processing by the processor 22 coupled to said memory.

The second class of instructions is directed to all processors in the active state. An example of such an instruction would be one that caused all processors in those storage sections which are in the active state to store a given data word character in the memories associated with said processors.

The third class of instructions are exemplified by instructions which can only be executed by a single processor. For example, only one processor 22 may read out the contents of its associated memory 20 at a time onto bus 26, since bus conflicts would obviously occur if more than one processor attempted such a read out. Hence, read out instructions are only directed to the first active processor. Similarly, when a data word is to be loaded into the memory 20 of a given storage section, this operation is performed by first causing the storage section in question to become the first active storage section and then issuing an input instruction which is only executed by the first active storage section.

The instructions executed by each of the processors 22 are specified by control signals on bus 26 and, preferably, involve at most two characters. The first character is a character of the data word stored in the memory 20 coupled to the processor 22 in question. This character is specified by the location of the character in question relative to the first character of the data word. The same location is specified for each storage section. That is, all processors 22 would carry out the instruction in question using the kth character stored in the memory 20 connected to each processor where k is specified by signals on bus 26.

The second character, referred to as the specification character, is broadcast to all of the processors 22 on bus 26. In addition to the conductors for communicating the various control signals, bus 26 includes one or more conductors for communicating the specification character to each processor 22. Preferably, there is one such conductor for each bit of the specification character. However, it will be apparent to those skilled in the art that different numbers of conductors could be used. For example, the specification character could be communicated to each processor 22 in a bit serial format on one conductor.

Before discussing the details of the preferred hardware embodiments of the present invention, a simple example of the use of the present invention will be given. The simplest embodiment of the present invention would be a memory used for detecting spelling errors. Here, each word from a document is compared with a list of correctly spelled words, referred to as a dictionary. If the word in question is found in the dictionary, the word is correctly spelled. If it is not found in the dictionary, it is marked for further checking and/or correction.

In this example, each storage section 18 would be used to store one word of the dictionary. For the purpose of this example, it will be assumed that the words in question are already stored in the various storage sections. Methods for entering the words into the storage sections will be discussed in detail below. To compare a given word, referred to as the specification word, with the words in the dictionary, the following operations are carried out. First, an instruction is given which causes each storage section 18 to enter the active state. Next a series of instructions is given to compare the specification word to each word in the dictionary. This comparison is performed one character at a time. That is, the first character of the specification word is compared to the character in the first character location in each memory 20. The second character of the specification word is then compared to the character in the second character location in each memory 20, and so on. If the specification word character in question fails to match a data word character to which it is compared, the state of the storage section containing said data word is changed to the inactive state. After the last specification word character has been compared to the corresponding character in each of the storage sections 18, the memory is tested to determine if a storage section in the active state remains. If so, the specification word was contained in the dictionary.

It should be noted that each processor performs the comparisons in question in parallel with the other processors. Hence, the time to search the dictionary is independent of the size of the dictionary. The search time is essentially that needed to compare the specification word with one data word in a single processor. Since the time to perform a comparison operation is essentially the same as the time needed to transfer the specification word character from the host data processing system to the content addressable memory, this dictionary matching procedure is limited only by the time needed to transfer the specification word.

Figure 2:
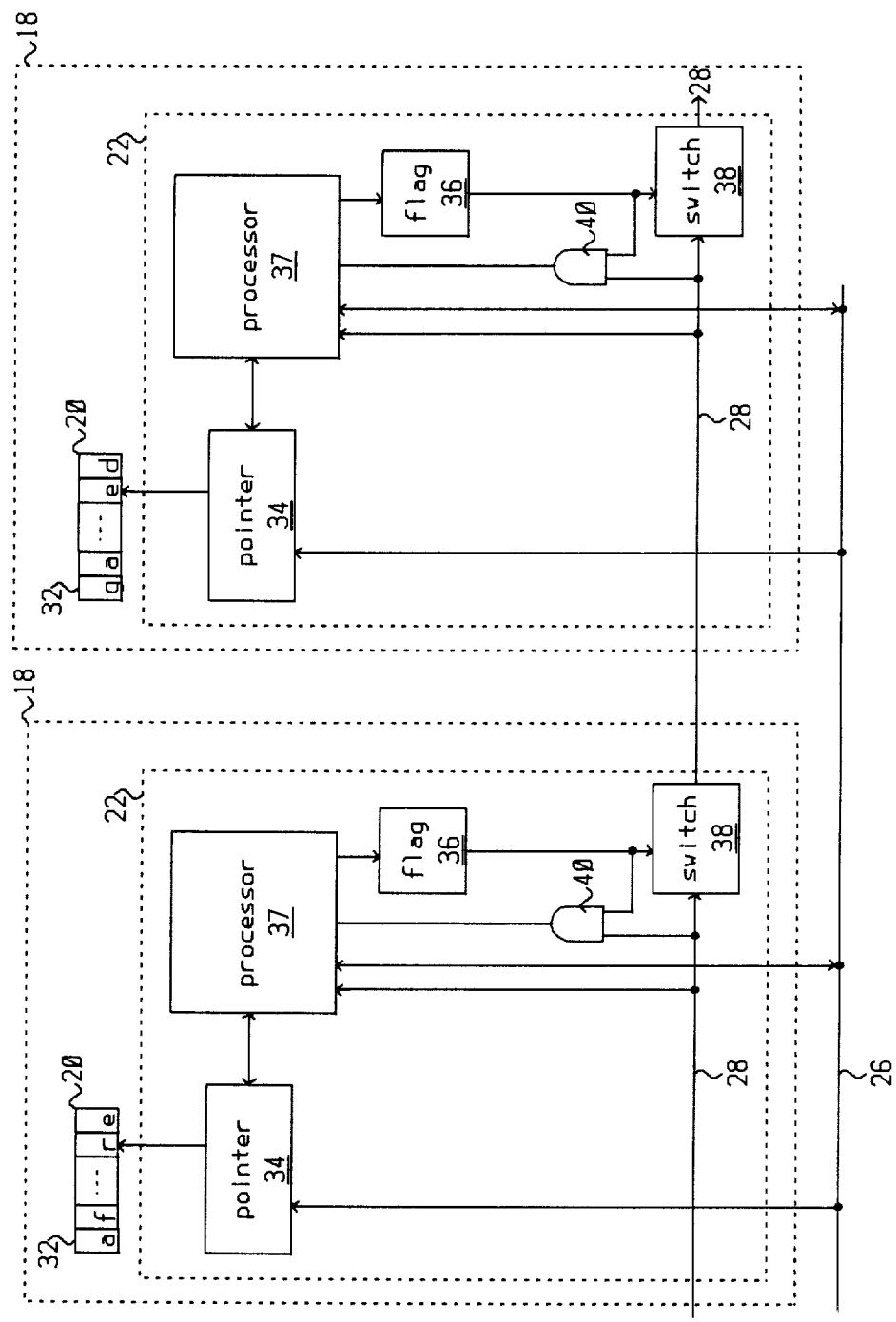
FIG. 2 is a more detailed diagram of two of the storage sections shown in FIG. 1.

A more detailed block diagram of two adjacent storage sections 18 is shown in FIG. 2. Each of the memories 20 consists of a plurality of storage locations 32. Each storage locations 32 is used to store one character of the data word stored in the memory 20 in question. A pointer 34 selects one of these storage locations and couples the storage location in question to a processor 37. Processor 37 decodes and executes the instructions communicated on bus 26 using the data word character selected by pointer 34. The storage location 32 selected by the pointer 34 is determined by control signals on bus 26. For the present discussion, it will be assumed that each memory 20 contains the same number of storage locations, N. Embodiments in which different memories 20 have different numbers of storage locations will be discussed in detail below.

The state, active or inactive, of a given storage section 18 is specified by a flag 36 which consists of a one bit memory cell, preferably a conventional set-reset flip-flop. The flag 36 controls a switch 38 which is used to interrupt the select line 28 when the flag 36 specifies the active state for the storage section 18 in question.

The first active storage section 18 is determined with the aid of an AND gate 40. The output of AND gate 40 will be "true" if a signal is present on the select line 28 and the flag 36 specifies the active state for the storage section 18 in question. The existence of such a true output indicates that the associated storage section 18 is the first active storage section. As described with reference to FIG. 1 above, the controller 19 places a signal on the select line 28 at the point at which said select line enters the first storage section 18 of the linear array of storage sections. This signal is preferably a DC voltage level. This signal will be present at a given storage section only if all of the switches 38 between the controller 19 and the storage section in question are closed thereby indicating that the associated storage sections are inactive. In other words, if any storage section between the storage section in question and the controller 19 is in the active state, no signal will be present on select line 28 at the location of the storage section in question.

It should also be noted that the end of the select line 28, shown at 29 in FIG. 1, may be used to detect the presence of a storage section 18 in the active state. If no such storage section exists, the signal placed on the select line 28 by the controller 19 will also be present on line 29. However, if any storage section is in the active state, the select line 28 will be broken at that point, via switch 38, and no signal will be detected on line 29.

In the preferred embodiment, each of the storage sections 18 is capable of executing eight instructions. These instructions are specified by the control signals on bus 26 discussed above.

The first three instructions which are executed by the processors 37 are used to set and reset the flags 36. The first instruction, referred to as "set flags", causes the flag 36 in each storage section 18 in the content addressable memory to be set to indicate the active state for that storage section 18. The second instruction, referred to as "reset first active", causes the flag 36 in the first active storage section 18 to be set to indicate the inactive state for that storage section. All other flags remain unchanged. The third instruction, referred to as "compare", causes the flag 36 to be reset to indicate the inactive state in each storage section 18 in which the character stored in the storage location specified by the pointer 34 does not match the specification character on bus 26. This compare operation occurs simultaneously in each of the storage sections 18 whether or not the flag 36 in a given storage section 18 has already been reset to indicate the inactive state for that storage section. If a storage section 18 already contains a flag 36 which specifies the inactive state for that storage section, that flag merely remains in this reset state.

The fourth, and fifth instructions referred to as "reset pointer", and "increment pointer", respectively, are used to control the storage location selected by each pointer 34. The reset pointer instruction causes each pointer 34 in the content addressable memory to indicate the first storage location in the memory 20 associated with that pointer 34. The increment pointer instruction causes each pointer 34 to indicate the next sequential storage location in the memory 20. If there is no such storage location, i.e., the pointer was already pointing to the last storage location in the memory 20, the pointer 20 is set to an overflow location which contains a special character which is not contained in any data word. In effect, a memory 20 designed to store N characters has in reality N+1 storage locations, the last storage location containing an "overflow" character. The uses of this overflow character will be discussed in detail below with reference to embodiments having different memory capacities in each storage section.

The sixth instruction, referred to as "read", causes the processor 37 to copy the character in the storage location specified by the pointer 34 in the first active storage section 18 to be copied onto the bus 26. This instruction is used for reading data words out of the content addressable memory.

The seventh and eighth instructions, referred to as "write first active" and "write active", respectively, are used to write characters into the memories 20. The write first active instruction causes the processor 37 in the first active storage section to copy the specification character on the bus 26 into the storage location currently specified by the pointer 34 in that storage section. If the pointer 34 indicates an overflow condition, i.e., it points to storage location containing the above mentioned overflow character, the character is not copied. The write active instruction causes the specification character on bus 26 to be copied into each of the storage sections 18 in the active state. If the pointer 34 in any storage section 18 indicates the overflow condition, the character is not copied in that storage section 18.

Although these eight instructions are preferred, a smaller number of instructions could be used. For example, the write active instruction is clearly optional, since it could be replaced by a repetitive series of instructions consisting of the write first active instruction followed by the reset first active instruction. Similarly, in those embodiments in which the contents of the memories 20 are loaded at the time the content addressable memory is fabricated, referred to as read-only embodiments, none of the write instructions are needed. In fact, in the spelling checking embodiment described above, the read instruction may also be eliminated. Finally, enhanced embodiments of the present invention which employ additional instructions will be discussed below.

2. Programming Examples

Before describing the processor hardware which implements these instructions, a few examples of how these instructions are used to store and retrieve data words from the content addressable memory will be given. These examples assume an embodiment of the present invention which includes memories which may be read or written. It will also be assumed that all memories have the same number, N, of storage locations.

Finally, it will be assumed that the host data processing system never issues an increment pointer instruction which caused an overflow condition in any of the pointers.

Before data words can be stored in the content addressable memory, the content addressable memory must be initialized. This involves writing an "empty data word" into each storage section. The empty data word can be any predetermined sequence of characters which will not be present in a data word. For the purpose of this discussion, an empty data word consisting of the same character repeated N times will be assumed.

The content addressable memory is initialized as follows. First all of the flags will be set using the set flags instruction. This causes each storage section 18 to be active. A reset pointer instruction is then given to set each pointer 34 to indicate the first storage location in each of the memories 20. Next N write active instructions are given. Each such instruction specifies the repeated character mentioned above. After each write active instruction is given, an increment pointer instruction is given to advance the pointer to the next storage location in each of the memories 20. At the end of these N write active instructions, each memory 20 will contain the empty word character in each storage location. In effect, the entire content addressable memory has been "erased". It should be noted that if one wanted to erase only the memory 20 in the first active storage section 18, the above process would be repeated with N write first active instructions containing the empty data word character in place of the N write active instructions Once the content addressable memory has been erased, one or more data words may be read into it. Since the content addressable memory has just been completely emptied, the data words will be read into memories 20 starting with the storage sections 18 closest to the controller 19 without first checking that these locations are free. The process is started by setting all of the flags using the set flags instruction. The first data word is read into the first storage section in the content addressable memory by issuing a reset pointer instruction followed by a series of N write first active instructions. Each write first active instruction, except the last one, is followed by an increment pointer instruction. Each write first active instruction contains one character of the data word which is to be written. At the end of these write first active instructions the data word in question will be stored in the memory 20 of the first storage section 18 in the content addressable memory and the pointers in all of the storage sections 18 will be positioned to indicate the Nth storage location.

A reset first active command is then given to reset the flag in the storage section 18 which just received a data word. As a result, the next storage section 18 in the sequence of storage sections will become the first active storage section The next data word is then written into this storage section 18 using the procedure described above. The process is repeated until all of the desired initial data words are stored in the content addressable memory.

After data words have been stored in the content addressable memory, one or more data words which match a particular specification word may be retrieved from the content addressable memory. This is accomplished in a two part operation. First, all of the storage sections 18 which contain data words which match the specification word in question are "marked" with set flags. Then the marked storage sections are read out, one word at a time, starting with the data word stored in the marked storage section 18 closest to the controller 19. The storage sections containing the data words in question are marked as follows. First, a set flags instruction is given to set all of the storage sections 18 to the active state, and a reset pointer instruction is given to select the first character storage location in each memory 20. Next a series of compare instructions is given. Each compare instruction contains one character of the specification word. This character is compared with the character stored at the storage location selected by pointer 34. If the characters do not match, the corresponding flag 36 is reset indicating that the storage section is now in the inactive state. After each compare instruction is given, the pointers 34 are incremented using an increment pointer instruction. When the last specification word character has been sent in a compare instruction, those storage sections 18 which contain data words which matched the specification word will still have flags 36 set to indicate the active state.

It is sometimes useful to specify the data words to be retrieved in terms of a specification word containing a "variable character", denoted by ?. The variable character is defined to match any character. Hence, all data words which match the specification word "nad?ion" would be equivalent to retrieving all data words which begin with the sequence "nad" followed by any character, followed by the sequence "ion". This is equivalent to giving three sets of instructions. First, three compare instructions containing the specification word characters "n", "a", and "d", respectively, each compare instruction being followed by a increment pointer instruction. Second, an additional increment pointer instruction is given to skip over the fourth storage location Finally, three compare instructions containing the specification word characters "i", "o", and "n", respectively are given, each compare instruction being followed by an increment pointer instruction Hence, no special instruction or character is defined for performing variable matches in the present invention, since a variable match is equivalent to an increment pointer instruction, if this variable character technique is employed.

Once the desired storage sections 18 have been marked, the data word stored in the first active storage section may be read out by giving a reset pointer instruction followed by a series of N read commands. Each read command returns one character of the data word stored in the memory 20 included in the first active storage section. The controller 19 copies each character placed on bus 26 to the host data processing system. After each character is read by the host data processing system, an increment pointer instruction is given. After the last character has been read out, a reset first active command is given which resets the flag associated with the storage section 18 which was just read out. The process is then repeated until all of the memories 20 associated with active storage sections 18 have been read out. When the flag 36 in the last active storage section 18 has been reset by a reset first active instruction, a signal will be present on line 29 shown in FIG. 1. The controller 19 makes this signal available to the host data processing system. Hence, the host data processing system can always determine if at least one of the storage sections 18 is still in the active state.

The above read out example assumes that one wishes to read out the entire data word that was marked by the comparison to the specification word. It should be noted that it is often desirable to select data words in the content addressable by matching a specific field in each data word to the specification word. Then a second field in each of the marked data words is read out. For example, consider a list in which each entry is the English spelling of a word followed by data specifying the pronunciation of the word. Each entry in the list could be stored as a single data word in the content addressable memory. Each said data word would consist of two fields. The first field would consist of the English spelling of the word. The second field would begin at a predetermined location in each data word and would consist of. the pronunciation data. One could then retrieve the pronunciation data corresponding to a given English word by matching the contents of the content addressable memory to a specification word consisting of the English spelling of the word in question. The match would be done starting with the first character of the first field. The word which matched this specification word would be marked by a set flag at the end of the matching process. The second field in that word could then be read out by positioning the pointer to the first character of the second field and then reading out the characters comprising this second field.

A particular data word can be erased from the content addressable memory at any time by first matching the contents of the content addressable memory to a specification word which matches the data word in question. This causes the storage section containing the data word in question to become the first active storage section. The empty data word is then written into the memory 20 associated with the first active storage section.

Similarly, a data word can be written into the first free storage section 18 by matching the contents of the content addressable memory against a specification word which is the empty data word. The new data word is then written into the memory 20 associated with the first active storage section by giving N write first active commands, as described above with reference to loading the initial data words into the content addressable memory.

In the above examples, it was assumed that all of the storage location in the memories 20 were used only to store data word characters. In general, those embodiments of the present invention which include memories which can be both read and written, some of the storage locations in the memories may be reserved as "scratch space" for storing processing information concerning the storage section in question. For example, one storage location, preferably the first storage location, may be used to store a "marker" character which is used to mark and retrieve sets of data words or to reactivate specific storage sections. This can best be understood with reference to the following example.

There are a number of data base retrieval problems in which each of the data words stored in the present invention would be a data base record consisting of a number of fixed fields, each field beginning at a predetermined storage location. For simplicity, assume that each storage section is used to store a data word which is divided into three fixed fields. Each field consists of a predetermined number of storage locations beginning at a predetermined storage location in each of the memories. We wish to retrieve all data words in which the first field matches either of two specification words and the second field matches a third specification word.

In principle, this could be accomplished by reading out all data words which have a first field which matches the first specification word into the host data processing system. Then reading out all data words which have a first field which matches the second specification word into the host data processing system. And, finally, having the host data processing system match the second data fields of all the data words so retrieved to the third specification word. This approach requires a significant amount of memory in the host data processing system, as well as a considerable quantity of host data processing system computational capacity. This can be avoided if one of the storage locations in each storage section 18 is used as a "scratch pad".

Assume that the data words are stored in each memory starting at the second storage location, and that the first storage location is reserved for the scratch pad. The above data retrieval problem can then be performed as follows. First, the scratch pad character in each storage section is filled with a blank character. This is accomplished by setting all of the flags 36 to indicate the active state, positioning the pointers 34 to indicate the first storage location, and then giving a write active instruction which contains the blank character.

Next, all storage sections which contain a data word having a first field which matches the first specification word are selected. This is accomplished by setting all of the flags to indicate the active state. The pointers 34 are then set to indicate the first storage location associated with the first field by giving a reset pointer instruction followed by an appropriate number of increment pointer instructions. A series of compare instructions is then given. Each compare instruction contains an appropriate character of the first specification word. Each compare instruction is followed by an increment pointer instruction, except the last such compare instruction. At the end of this series of compare instructions, only those storage sections which contained data words which matched the first specification word will be in the active state. These storage sections are marked by resetting all of the pointers in the content addressable memory to indicate the first storage location and then giving a write active instruction containing a predetermined marker character.

All storage sections which contain a data word having a first field which matches the second specification word are then selected in a similar manner. All of the flags are again set to indicate the active state using a set flags instruction. The pointers 34 are positioned to indicate the first storage location associated with the first field and then a series of compare instructions is given. Each compare instruction contains an appropriate character of the second specification word. Each compare instruction is followed by an increment pointer instruction, except the last such compare instruction. At the end of this series of compare instructions, only those storage sections which contained data words which matched the second specification word will be in the active state. These storage sections are marked by resetting all of the pointers in the content addressable memory to indicate the first storage location and then giving a write active instruction containing the predetermined marker character.

Next, all storage sections which were selected in the above two matching operations are made active. This is accomplished by positioning the pointers to indicate the first storage location in each storage section using a reset flags instruction. All of the storage sections are then made active by giving a set flags instruction. Finally, a compare instruction which contains the predetermined marker character is given. After this compare instruction is executed, those storage sections which had the marker character in the first storage location will still be active. These are precisely those storage sections in which the first field matched the first specification word or the second specification word. All other storage sections will be inactive.

Finally, those remaining storage sections in which the second field does not match the third specification word are set to the inactive state by matching the contents of the third field to the third specification word. This is accomplished by positioning the pointers to indicate the first storage location of the second field and then giving a series of compare instructions. Each compare instruction contains an appropriate character of the third specification word. Each compare instruction is followed by an increment pointer instruction, except the last such compare instruction At the end of this series of compare instructions, only those storage sections which contained data words in which the first field matched either the first or second specification words and the second field matched the third specification word will be in the active state. These data words may then be read out as described above.

There are a number of data base retrieval problems in which one wishes to retrieve all data words in which a specified field is between two predetermined values. For example, a field may be used to store a number, one digit of said number being stored in each character of the field. One may wish to select all data words in which this number is between some minimum and maximum value. In principle, the above instructions could be used for performing this operation by successively retrieving all records which match each possible number in the range specified by said minimum and maximum values. However, if the range of numbers is large, this will not be practical.

A modified embodiment of the present invention as described above may be used to accomplish this type of data word selection. Before explaining the operation of this modified embodiment, the ordering of two multi-character fields must be defined. To accomplish this, the ordering of two characters will first be defined. Each character is assumed to have W bits. The bit pattern which represents a given character also represents a binary integer having a value between 0 and $2^{W-1}$. This integer will be referred to as the numerical representation of the character in question. A character C will be said to be greater than a character D if the numerical representation of C is greater than the numerical representation of D. Similarly, C is less than D if the numerical representation of C is less than the numerical representation of D. Finally, C is equal to D if there numerical representations are equal. This is the preferred ordering of two characters; however, it will be apparent to those skilled in the art that other orderings are possible A sequence of K characters, e.g., a field in a data word or the data word itself, may be considered to be a K "digit" number of radix $2^W$. Two such numbers, P and Q, may be compared by performing a sequence of comparisons involving the individual digits of each number. The individual digits are compared in order of their significance, starting with the most significant digit of each number. If the most significant digits are not equal, the number having the larger digit is defined t be the greater of the two numbers independent of the remaining digits. If the two digits are equal, the next most significant digits are compared. This is repeated until either one of the numbers has a digit which is greater than the corresponding digit of the other number or no more digits remain. In this later case, the two numbers are equal.

Consider a simple example in which P and Q have the usual radix 10 digits. Assume P=378 and Q=369. The two numbers are compared as follows. First the most significant digit of each number is compared. In this case, the most significant digit of each number is a "3". Since these digits are equal, the comparison continues with the next most significant digits, 7 and 6. Since 7 is greater than 6, P is the defined to be the larger number, and the comparison process terminates.

This process may be used to order two data fields, P and Q, each consisting of K characters. P will be said to be greater than Q if the K digit number of radix $2^W$ represented by P is greater than the K digit number of radix $2^W$ represented by Q. The modified embodiment of the present invention allows this comparison to be made in each storage section and the flag of each storage section to be reset in response to the result of the comparison.

In an alternate embodiment of the present invention, each processor 37 includes a means for specifying three compare states, greater than, less than, and equal, for the storage section 18 in which it is located. An instruction referred to as "set equal" is provided which causes each processor 37 to specify the equal state. This instruction is triggered by a predetermined control signal on bus 26. This set equal instruction is used to initialze each processor 37 prior to a series of numerical comparison operations.

Each processor 37 in this alternative embodiment also responds to a second instruction referred to as "numerical compare" which is also triggered by a control signal on bus 26. When a numerical compare instruction is received by a processor, the processor compares the specification character on bus 26 with the character specified by the pointer 34. If processor is in the equal state when the numerical compare instruction is received, the compare state will be changed to the greater than state if the specified character of the data word is greater than the specification character. If processor is in the equal state, the compare state will be changed to the less than state if the specified character of the data word is less than the specification character. If the two characters are equal, or if the processor is not in the equal state when the numerical compare instruction is received, no action is taken.

Three additional numerical comparison instructions are defined in this embodiment of the present invention. These instructions are used to reset the flag 34 in response to the comparison state of the processor 37. The first instruction, referred to as "reset if greater than" causes the flag to specify the inactive state for the storage section if the compare state of the processor is the greater than state. This instruction is specified by one of the control signals on bus 26.

The second instruction, referred to as "reset if equal" causes the flag to specify the inactive state for the storage section if the compare state of the processor is the equal state. This instruction is also specified by one of the control signals on bus 26.

The third instruction, referred to as "reset if less than" causes the flag to specify the inactive state for the storage section if the compare state of the processor is the less than state. This instruction is also specified by one of the control signals on bus 26.

Some examples of the use of these numerical compare instructions to select data words will now be given. In the first example, one wishes to select data words which contain a data field which is greater than a given specification word. The process begins with setting all flags in the content addressable memory to indicate the active state and all processors to indicate the equal compare state. The pointer is then positioned to the beginning of the data field in question. A series of numerical compare instructions is then given. Each numerical compare instruction contains one character of the specification word. After each numerical compare instruction is given, the pointer is positioned to the next character of the data field. The characters are sent in decreasing order of significance. That is the most significant character of the specification word is compared with the corresponding character of the data field. Then the next most significant character of the specification word is compared to the character in the storage location corresponding to it in the data field, and so on, until all characters of the specification word have been compared to the characters stored in the corresponding storage location is the memory.

At the end of these comparisons, the comparison state of each processor will reflect the results of the comparison between the specification word and data field of the data word stored in the memory associated with that processor. If the data field was greater than the specification word the processor will be in the greater than comparison state. Similarly, if the data field was less than the specification word, the processor will be in the less than comparison state. Finally, if the data field was equal to the specification word, the processor will be in the equal comparison state.

In this example, the storage sections which contain data words in which the data field in question was greater than the specification word are to be selected. Hence, the flags of the storage sections which contain data words in which the data field was less than or equal to the specification word are to be reset. This is accomplished by giving a reset if less than instruction and a reset if equal instruction. The data words in the desired storage sections may then be read out by giving the appropriate read instructions as described above.

Next consider the case in which all data words in which the data field is greater than a first specification word and less than a second specification word are to be recovered. Here, one would first mark all storage sections containing data words in which the desired data field was greater than the first specification word by repeating the instructions described above with the first specification word. At the end of this process, all storage sections containing data words in which the data field in question was greater than the first specification word would be in the active state.

Next, all of the data words in the content addressable memory would be compared to the second specification word. This is accomplished without changing the state of the flags in the storage sections. All processors are first set to indicate the equal compare state. The pointer is then positioned to the beginning of the data field in question. A series of numerical compare instructions is then given. Each numerical compare instruction contains one character of the second specification word. After each numerical compare instruction is given, the pointer is positioned to the next character of the data field. The characters are sent in decreasing order of significance as was described with reference to the comparison to the first specification word.

The flags in those storage sections in which the data field in question was greater than or equal to the second specification word are to be reset. Hence, the flags of the storage sections which contain data words in which the data field was greater than or equal to the second specification word are to be reset. This is accomplished by giving a reset if greater than instruction and a reset if equal instruction. At the end of this reset operation, only storage sections in which the data field in question was greater than the first specification word and less than the second specification word will have set flags. The data words in the switch storage sections may then be read out by giving the appropriate read instructions as described above.

It should be noted that this embodiment of the present invention does not require the non-numerical compare instruction. A series of non-numerical compare instructions is equivalent to a a series of numerical compare instructions followed by a reset flags if greater than and reset flags if less than instructions.

The above examples with reference to the various embodiments of the present invention have assumed that all of the memories 20 shown in FIGS. 1 and 2 have the same number of storage locations. There are a number of cases in which storage sections having different numbers of storage locations would be preferred. For example, in the case of a simple spelling checking content addressable memory as described above, each storage section has one word of the dictionary programmed into it at the time the content addressable memory is constructed. Different words require different numbers of storage locations depending upon the number of characters in the words. In principle, each storage section could be equipped with a memory which was large enough to store any word in the dictionary; however, this would clearly be wasteful of storage space.

To avoid such waste, the present invention may include the overflow character described above. This character is different from any character used in a data word. Hence, it will not match any character in a data word. This character provides a means for accommodating storage sections having memories which contain different numbers of storage locations.

The use of storage sections in which the memories 20 have different numbers of storage locations causes three problems. First, in a comparison operation, those storage sections which have memories which are too small to possibly contain a data word which matches the specification word must be eliminated from consideration. Second, the host data processing system must be able to ascertain when it has read out the last character of a data word Third, the host data processing system must be able to select empty storage sections of the appropriate length when a new data word is to be stored in the content addressable memory. This special overflow character provides a means for solving all of these problems.

If a storage location which is outside the range of the pointer 34 is specified by an increment pointer instruction, the pointer couples this overflow character to the processor 37. Since this character will not match any know specification character, any comparison which involves a storage location outside the range of the pointer will result in the flag being reset in the storage section in question. This automatically eliminates the storage section in question as possible candidate for matching the specification word in question in a non-numerical comparison operation.

The host data processing system must be able to determine when it has read all of the characters of a particular data word. If the data words are all of the same length, N, the host data processing system merely gives N read commands, each read command being followed by an increment pointer command. In embodiments which employ this overflow character, the host data processing system may use this special character to detect the end of the data word.

Ideally, a new data word to be stored in the content addressable memory would be placed in an empty storage section having a memory size which matches the data word's number of characters. If no such storage section exists, the data word is preferably stored in an empty storage section having a memory which is larger than the data word in question but less than or equal to the size of the memory in any other empty storage section. This can be accomplished with the use of a scratch pad character as described above. Assume that a new data word requiring P storage locations is to be stored in the content addressable memory. First, the contents of the content addressable memory are matched against a specification word containing P "empty" characters. If no such storage sections exist, i.e., all storage sections are inactive after the match, the memory is full, at least in terms of storing data words of this size or greater. Assume that at least one storage section in the active state exists at the end of this match. This match selects all empty storage sections which have at least P storage locations. These storage sections are marked by writing a marker character into the first storage location in each storage sections.

Next, those storage sections which are too large are eliminated from the storage sections so marked. This may accomplished as follows. The storage sections marked in the match to P empty characters are activated by giving a set flags instruction followed by matching the contents of the content addressable memory to the marker character. These storage sections which remain in the active state contain the marker character in the first storage location and P-1 empty characters in the second though Pth storage locations. The process in question is an iterative one. Define a variable K which is initially equal to P. Match the contents of the content addressable memory to K empty characters starting with the second storage location. If any storage sections remain active, mark their first storage location with a second marker character. These storage sections have memories which are greater than or equal to (K+1) characters in length. Next set all the flags to indicate the active state and match the first storage location in each storage sections to the first marker character. If any storage sections remain active, store the new data word in the first active storage section. If no storage sections remain active, increment K by one, replace the second marker character by the first marker character and repeat the process. It is known that there exists at least one storage section which is large enough to store the data word, since the original match to P empty characters yielded at least one storage section in the active state. Hence, an appropriate storage section will eventually be found by this procedure.

In those embodiments of the present invention which include the numerical compare instructions described above, a somewhat simpler procedure may be employed. In such embodiments, the first storage location in each storage section is used to store a character whose numerical value is equal to the number of characters which may be stored in the memory in question. If one character is not sufficient for this purpose, two or more may be used. This data is preferably permanently stored in the storage locations in question when the content addressable memory is fabricated.

The storage sections which have memories of a specified number of storage locations can be selectively activated by setting all the flags to indicate the active state and then performing a numerical comparison with a first specification word whose characters specify the desired number of storage locations. These storage sections can then be matched against a second specification word having the appropriate number of empty characters to find an empty storage section of the desired length. If no such empty storage section is present, storage sections having a larger number of storage slots may be sought by repeating the process with a first specification specifying a larger memory size.

When a numerical comparison operation is to be performed, only those storage sections having sufficiently large memories to be candidates in the match must be chosen. This can be accomplished by first resetting the flags in all storage sections which have less than the desired number of storage sections. This may be accomplished in a manner analogous to that described above. A specification word having characters which specify the desired minimum number of characters is first matched against the storage locations which contain the characters which specify the lengths of the various memories. A reset flags if less than instruction is then given to eliminate the storage sections which contain memories which are too small to contain the desired data records.

In the above examples, certain repeated sequences of instruction are evident. For example, a read instruction followed by an increment pointer instruction. It will be apparent to those skilled in the art that in embodiments of the present invention which employ the controller 19 shown in FIG. 1, the controller 19 may include circuitry for issuing such sequences of instructions in response to single operation instruction sent by the host data processing system to the controller over bus 30.

3. Hardware Details

Figure 3:
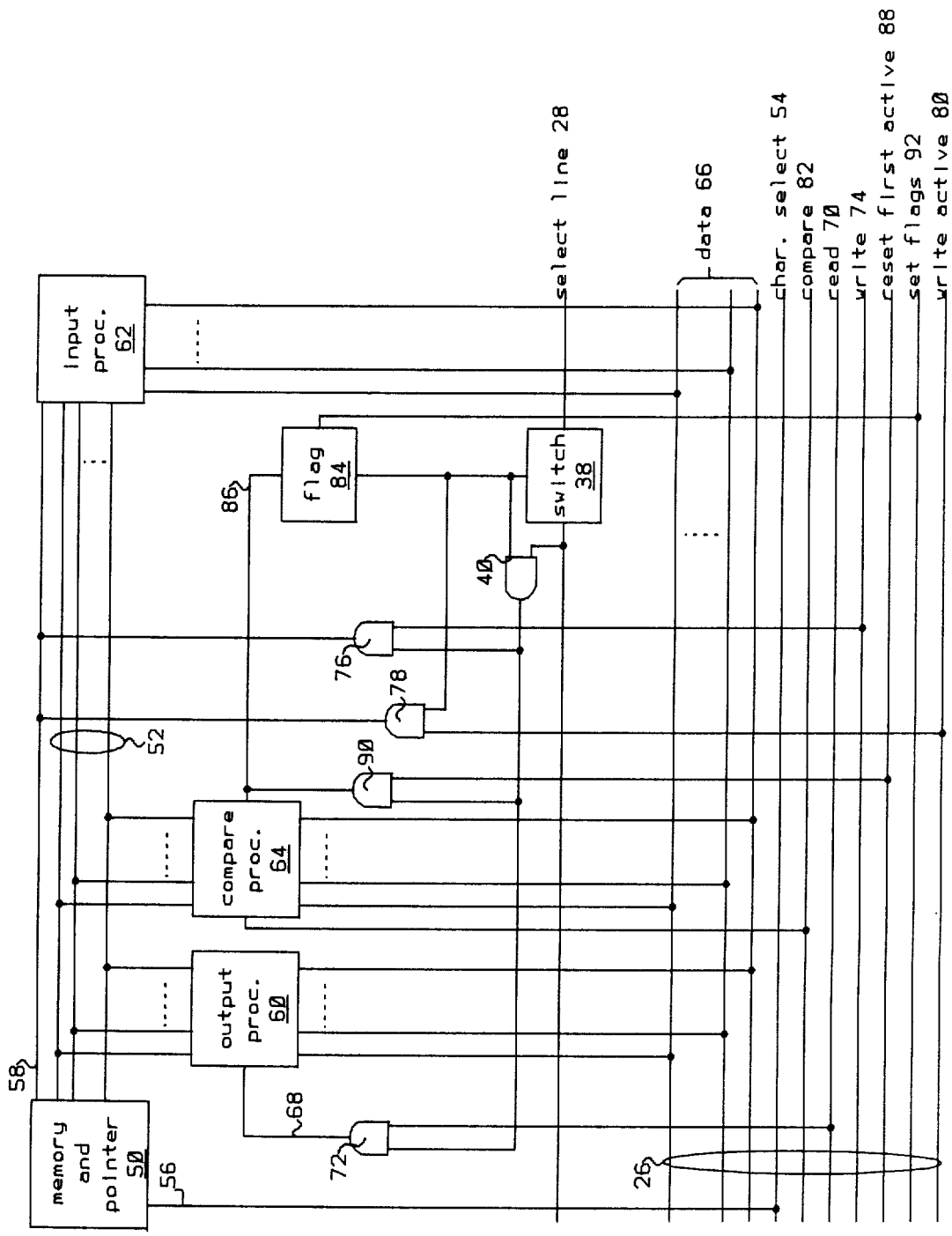
FIG. 3 is a a more detailed diagram of a storage section according to the present invention.

A more detailed illustration of a storage section 18 and the various conductors in bus 26 is shown in FIG. 3. The storage section 18 shown includes a memory 50 which includes the pointer function shown in FIG. 2 at 34. The memory includes a plurality of storage locations, each storage location providing storage for one character. The signals specifying the character stored in a selected storage location are placed on a memory bus 52 which includes one conductor for each bit corresponding to each bit of the character in question. In general, this is accomplished by coupling the storage location in question to the memory bus. The storage location which is selected for coupling to the memory bus 52 is specified by signals on a character select bus 54 included in bus 26. These signals are connected to the memory by a bus 56 which has one conductor corresponding to each conductor in the character select bus 54.

The number of conductors in the character select bus 54 will depend on the mode of addressing used to specify a specific storage location. In the above examples, two conductors would be necessary, one for a reset pointer signal and one for an increment pointer signal. However, it will be apparent to those skilled in the art that other methods of specifying a storage location may be used. For example, a binary number specifying the storage location in question could be placed on a plurality of character select bus lines which are decoded by the memory 50.

In general, the memory 50 couples the character stored in the selected storage location to memory bus 52 unless a signal is present on input line 58. In this case, the memory copies the character present on the memory data bus 52 into the specified storage location. In those embodiments of the present invention which are "read-only", input line 58 is absent, and, the character in the selected storage location is always coupled to the memory bus 52.

The storage section 18 shown in FIG. 3 contains three processing elements, an output processor 60, an input processor 62, and a comparison processor 64. Each of these processors are coupled to the memory bus 52 and to a plurality of data lines 66 in bus 26. The data lines 66 are used to communicate a specification word character to each storage section in the content addressable memory. The data lines 66 are also used to send a copy of the character stored in the selected storage location in the first active storage section to the controller 19 shown in FIG. 1. There is one data line corresponding to each conductor in memory bus 52.

The output processor 60 couples each conductor in the memory data bus 52 to the corresponding data line 66 in bus 26 in response to a signal on line 68. This signal is generated in the first active storage section in response to a signal on the "read" line 70 of bus 26. AND gate 72 connects line 68 to the read line 70 in response to a true output from AND gate 40 which detects whether or not the storage section in question is the first active storage section. In embodiments of the present invention in which data is not read out of the present invention, i.e., the simple spelling checker described above, the output processor 60, AND gate 72, and read line 70 may be omitted.

The input processor 62 couples each conductor in the memory data bus 52 to the corresponding data line 66 in bus 26 in response to a signal on line 58. This signal is generated in the first active storage section in response to a signal on the "write first" line 74 of bus 26. AND gate 72 connects line 58 to the write line 74 in response to a true output from AND gate 40 which detects whether or not the storage section in question is the first active storage section. A signal is also generated on line 58 in response to a signal on the "write active" line 80 of bus 26 when the flag in the storage section in question indicates the active state for said storage section AND gate 78 copies the signal on the write active line 80 onto line 58 when the storage section is in the active state. In embodiments of the present invention in which data is not read into the present invention, i.e., the read-only versions of the present invention, the input processor 62, AND gate 76, AND gate 78, write first line 74 and write active line 80 may be omitted.

The comparison processor 64 compares the signal on each conductor of the memory bus 52 with the signal on the corresponding data line 66 in response to a signal on the "compare" line 82 of bus 26. If the signals compared on any of the conductors do not match, the compare processor 64 resets the flag 84 by generating a signal on line 86. The flag 84 serves the same function as flag 36 shown in FIG. 2. Flag 84 may also be reset by signal on the "reset first active" line 88 of bus 26 if the storage section in question is the first active storage section. The signal on the reset first active line is coupled to line 86 by AND gate 90 in the first active storage section. The flag 84 is set by a signal on the "set flags" line 92 of bus 26.

Flag 84 is preferably reset on the trailing edge of the signal on line 88 of bus 26. This avoids "race" problems which could result in the Flag 84 being reset in one or more of the storage sections which follow the current first active storage section. This can be best understood with reference to the following example. Suppose that flag 84 was reset when the signal on line 88 was greater than some predetermined value. Then when a reset first active instruction resulted in a signal of line 88, the flag 84 in the first active storage section would be reset at a time at which the leading edge of the signal on line 88 crossed the reset potential. Shortly after this point in time, switch 38 would close which would result in the next storage section with a set flag 84 becoming the first active storage section. If the reset signal is still present on line 88, this storage section will also reset its flag 84 which would cause errors in the functioning of the content addressable memory. This problem is avoided if the flag 84 resets on the trailing edge of the signal on line 88, since the signal will gone by the time the next storage section with a set flag 84 recognizes that it is the first active storage section.

Figure 6:
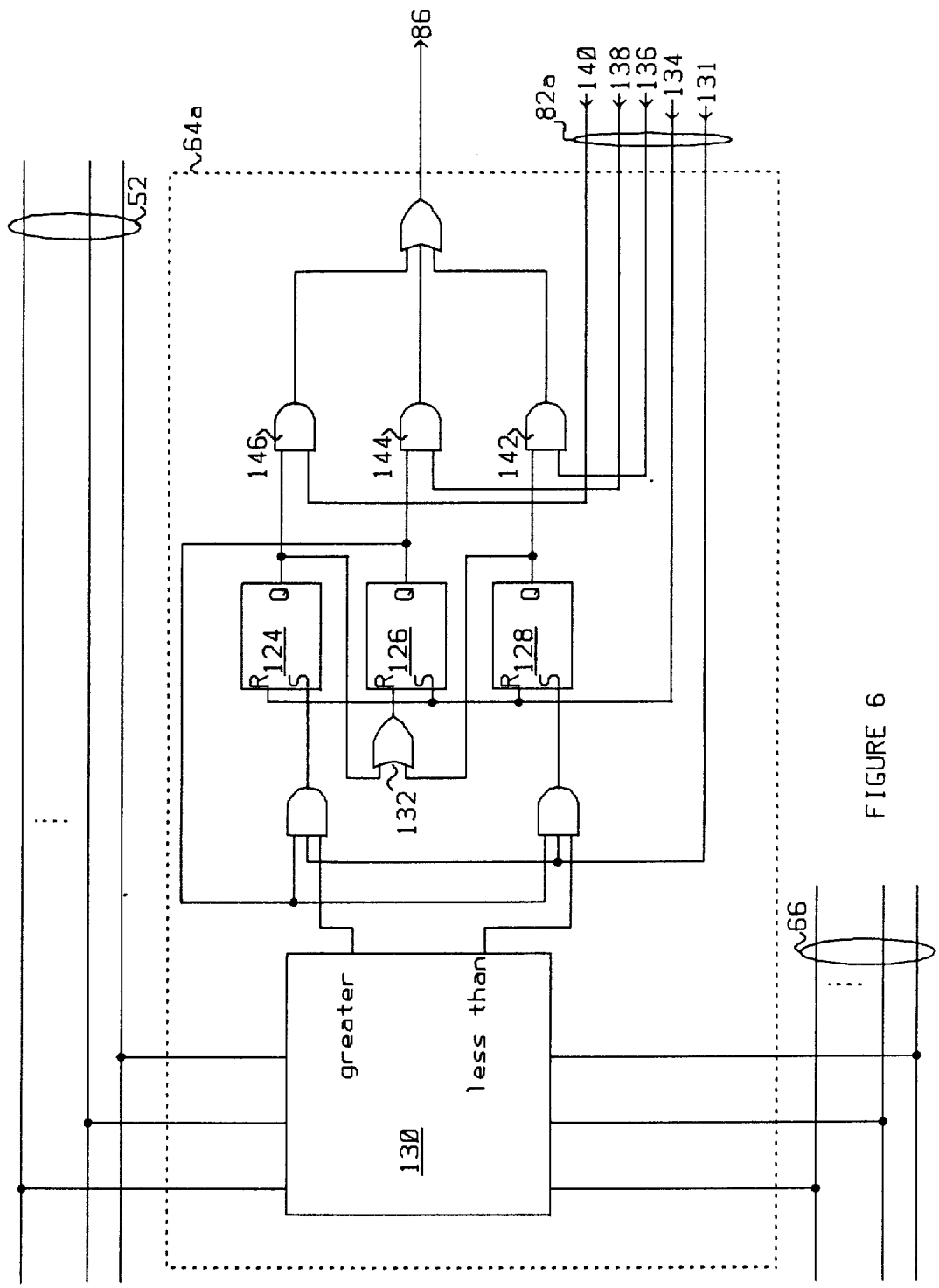
FIG. 6 is illustrates a second embodiment for the comparison processor shown in FIG. 3.

In those embodiments of the present invention in which numerical comparison instructions are used, the compare line 82 is replaced by a compare bus having one conductor for each of the numerical compare instructions described above. These conductors will be discussed in more detail below with reference to FIG. 6.

Figure 4:
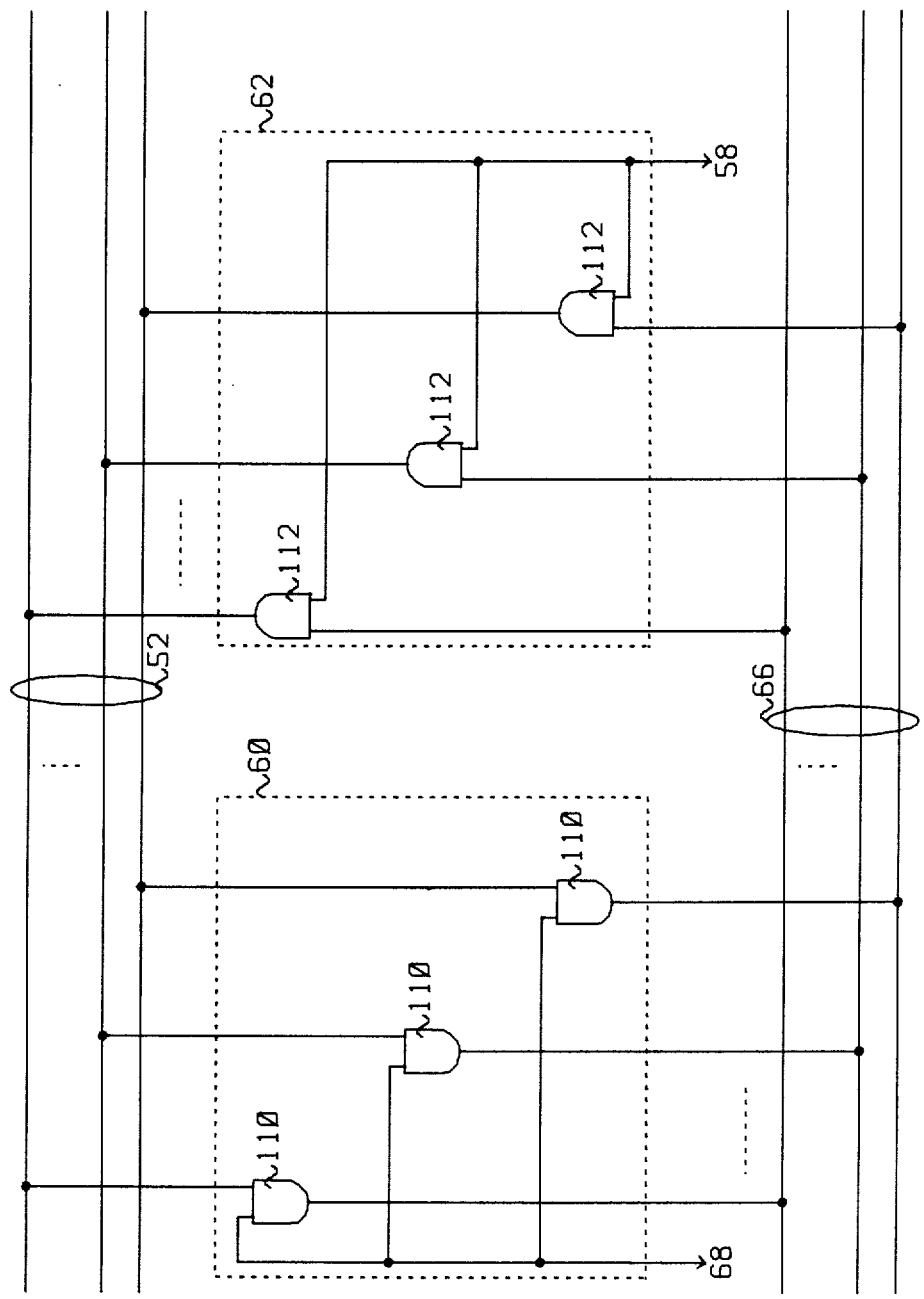
FIG. 4 is a more detailed diagram of the input and output processors shown in FIG. 3.

The output processor 60 and input processor 62 are shown in more detail in FIG. 4. Each of these processor consists of a plurality of AND gates which are used to couple one conductor in the memory bus 52 to a corresponding data line 66 in bus 26. The AND gates 110 in the output processor 60 copy the signals on each conductor of memory bus 52 to the corresponding data line 66 in response to a signal on line 68. The signal on line 68 is generated in the first active storage suction by AND gate 72 shown in FIG. 3. The AND gates 112 in the input processor 62 copy the signals on data lines 66 representing a specification character onto the corresponding conductors of memory bus 52 in response to a signal on line 58. The signal on line 58 is generated in the first active storage section by AND gate 76 or AND gate 78. The AND gates 110 and 112 are of conventional design.

Figure 5:
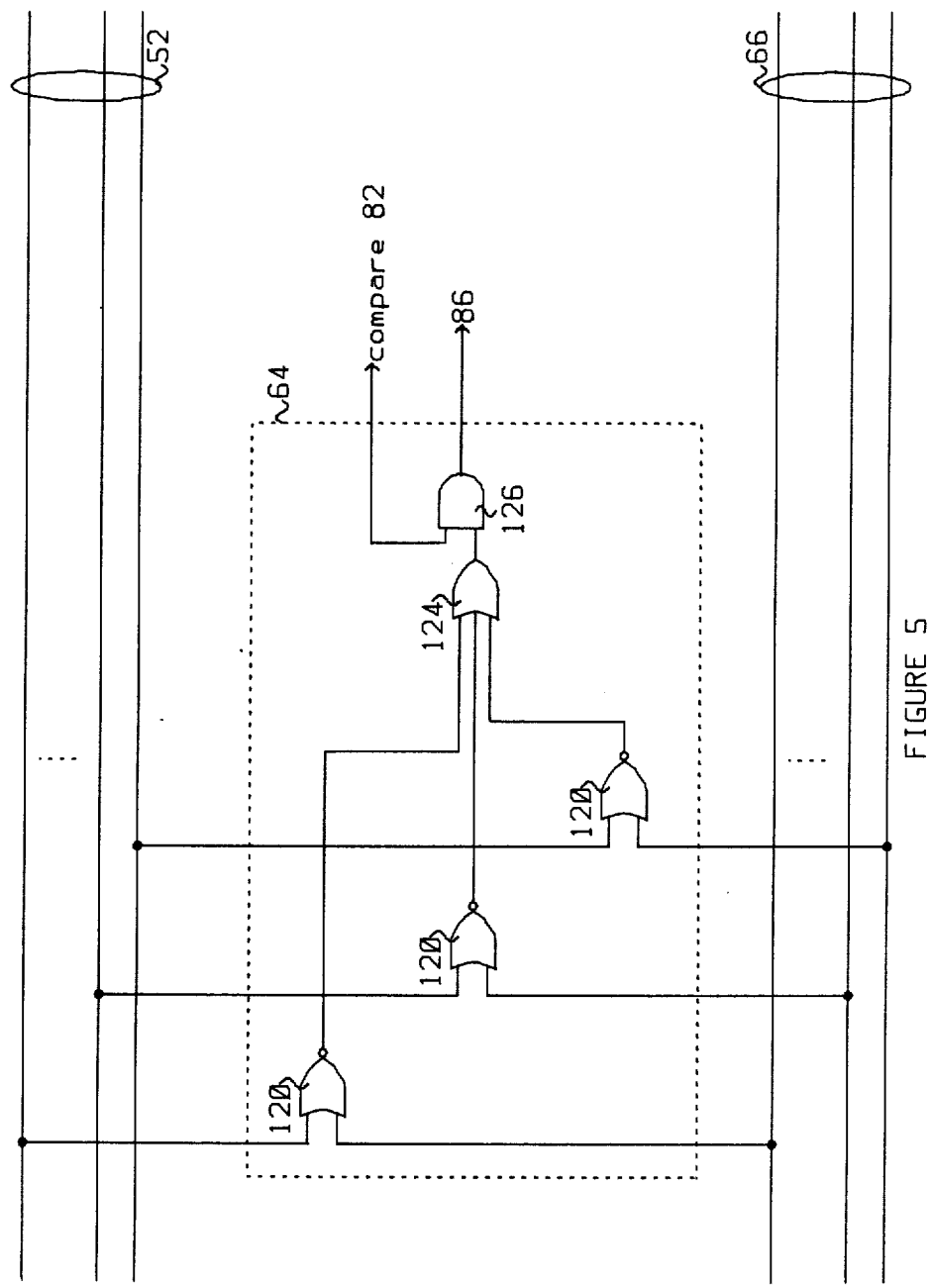
FIG. 5 is a more detailed diagram of a comparison processor for use in the storage section illustrated in FIG. 3.

In those embodiments of the present invention which do not include the numerical comparison instructions described above, a relatively simple comparison processor 64 may be employed. Such a processor is known in FIG. 5. The comparison processor 64 resets the flag 84 in response to a signal on compare line 82 in bus 26 if the character on the data bus 52 does not match the character on the data lines 66 of bus 26. The comparison processor 64 includes a plurality of exclusive NOR gates 120. Each exclusive NOR gate 120 compares the signal present on one of the conductors in the data bus 52 to the signal present on the corresponding data line of bus 26. If the signals do not match, the exclusive NOR gate in question generates an output signal. The outputs of the exclusive NOR gates 120 are used as input to an OR gate 124. The output of OR gate 124 is gated onto the reset line 86 of flag 84 shown in FIG. 3 by AND gate 126 in response to a signal on the compare line 82 of bus 26.

In those embodiments of the present invention which include the numerical comparison instructions described above, a more complex comparison processor 64 is required. The preferred embodiment of such a processor is shown at 64a in FIG. 6. As pointed out with reference to FIG. 3, the "compare line" 82 of bus 26 includes a plurality of conductors in embodiments of the present invention which implement the numerical compare instructions discussed above. These conductors are shown at 82a in FIG. 6.

The "compare state" of the processor described above with reference to the numerical comparison instructions is stored in three set-reset flip-flops of conventional design. The greater than state is stored in flip-flop 124. The equal state is stored in flip-flop 126. And, the less than state is stored in flip-flop 128.

The comparison processor 64a also includes a comparison circuit 130 which compares the signals present on each conductor of data bus 52 with the signals present on the corresponding data line 66 in bus 26. The comparison circuit 130 generates one of two signals if any of the pairs of signals in question do not match. If numerical representation of the character on data bus 52 is greater than the numerical representation of the character on bus 66, a "greater than" signal is generated. If numerical representation of the character on data bus 52 is less than the numerical representation of the character on bus 66, a "less than" signal is generated. Comparison circuit 130 is conventional in design.

When the comparison processor is in the equal state, i.., flip-flop 126 is set, the greater than signal of comparison circuit 130 is gated to the set line of flip-flop 124, and the less than signal of comparison circuit 130 is gated to the set line of flip-flop 128. Both of these gating operations are performed in response to a signal on a conductor 131 included in the compare lines 82 of bus 26. The controller 19 shown in FIG. 1 generates a signal on conductor 131 in response to a compare instruction. If either flip-flop 124 or flip-flop 126 becomes set as a result of a signal on one of the comparison circuit 130 outputs, OR gate 132 generates a reset signal for flip-flop 124. Flip-flop 126 may be set, and flip-flops 124 and 128 simultaneously reset, by a signal on conductor 134 included in the compare lines 82a.

The flag 84 shown in FIG. 3 may be reset in response to the state of any of the three flip-flops 124, 126, or 128, by a signal on the appropriate one of conductors 136, 138, or 140, included in compare lines 82a. Each of these conductors is connected to an AND gate which gates the output of the flip-flop in question onto the reset line 86 of the flag 84 shown in FIG. 3. A signal on conductor 136 gates the output of flip-flop 128 onto reset line 86 through AND gate 142. A signal on conductor 136 gates the output of flip-flop 126 onto reset line 86 through AND gate 144. And, a signal on conductor 138 gates the output of flip-flop 124 onto reset line 86 through AND gate 146.

Figure 7:
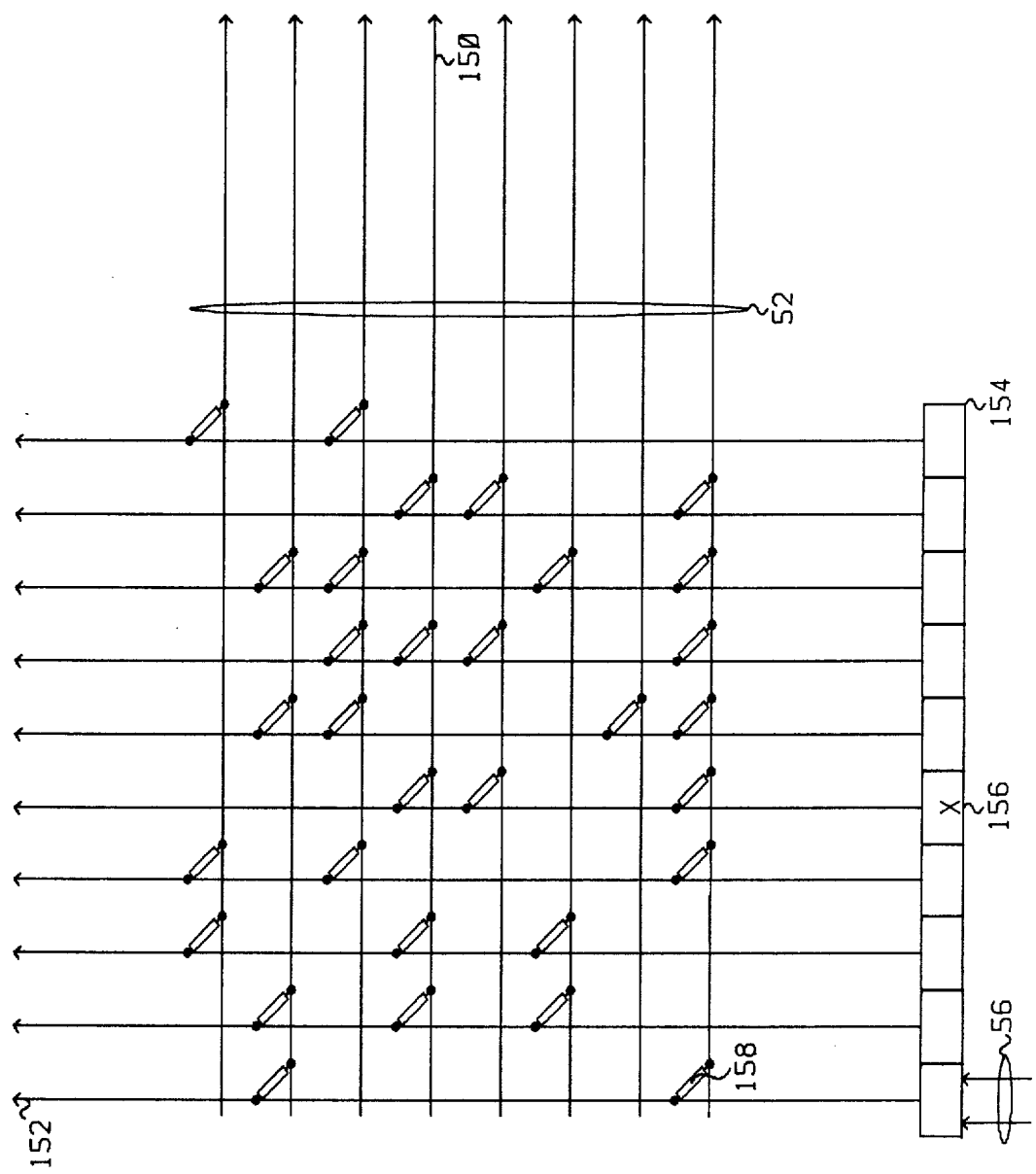
FIG. 7 illustrates a read-only memory for use in the storage section shown in FIG. 3.

The preferred embodiment of the memory and pointer shown at 50 in FIG. 3 will, in general, depend on the type of data being stored in the present invention. Three general memory embodiments will now be discussed in this regard. Then embodiments which use a combination of these memory techniques will be discussed. The simplest of these embodiments is a read-only memory in which the data is "stored" in the memory at the time the memory is fabricated. Such a memory is illustrated in FIG. 7. The memory includes a plurality of "horizontal" conductors of which conductor 150 is typical. If a character is W bits wide, there will be W such horizontal conductors, one for each bit of a character. Each horizontal conductor 150 corresponds to one of the conductors in memory data bus 52.

The memory also includes a plurality of "vertical" conductors of which 152 is typical. If the memory stores N characters, there will be N such vertical conductors, one for each character stored. A given character is selected for coupling to memory data bus 52 by applying a potential to the vertical conductor corresponding to that character. This is accomplished with the aid of a pointer register 154 which contains one memory cell corresponding to each vertical conductor. Only one of these memory cells contains a "1" at any given time. Such a cell is indicated by the "X" shown at 156. The output of this memory cell is set to the potential in question when the memory cell contains a "1". The location of this memory cell is determined by signals on the character select lines 56 shown in FIG. 3.

Each bit of a character stored in the memory may be in one of two states, a "1" or a "0". Those bits which are in the "1" state are specified by connecting the vertical conductor corresponding to the character in question to the horizontal conductor corresponding to the bit in question by a storage link of which 158 is typical. To prevent the potential coupled to one of the vertical conductors from being coupled to another vertical conductor through one or more of the horizontal conductors, the storage links are constructed in a manner which allows current to pass in only one direction. For example, each storage link 152 could be a diode.

In a "mask progammable" read only memory, the storage links 152 are specified as part of the fabrication process. One or more of the masks used in the construction of the memory specifies the location of the diodes which are to connect the various horizontal and vertical conductors. A memory fabricated in this manner may not be reprogammed after it is constructed. Embodiments of the present invention which include read-only memories of this type would be useful in data retrieval problems satisfying two conditions. First, a large number of copies of the same data base must be needed to justify the cost of a separate fabrication process for each memory. Second, the stored data records are not of the type which must be periodically updated. A content addressable memory which includes a language dictionary is an example of such an embodiment of the present invention. The various spellings of the words in the English language are not, in general, changed over the useful life of a content addressable memory. Furthermore, this data base would be useful in a large number of word processing applications.

The main advantages of such mask progammable embodiments of the present invention lie in the small amount of silicon area required to store each bit and the non-volatility of the data stored. Since each bit requires at most one diode, the number of bits which may be stored in a given area of silicon is, in general, much greater than that which may be obtained using other memory processes. This is particularly important when a very large data base consisting of literally millions of data words must be stored. In addition, the data stored is not lost if power is removed from the content addressable memory. Hence, the content addressable memory may act as a means for permanent storage of the data base in the host data processing system. This eliminates the need to provide additional storage space for the "permanent" copy of the data base and the need to copy the data base in question from this permanent storage location into the content addressable memory each time the content addressable memory is turned on.

Figure 8:
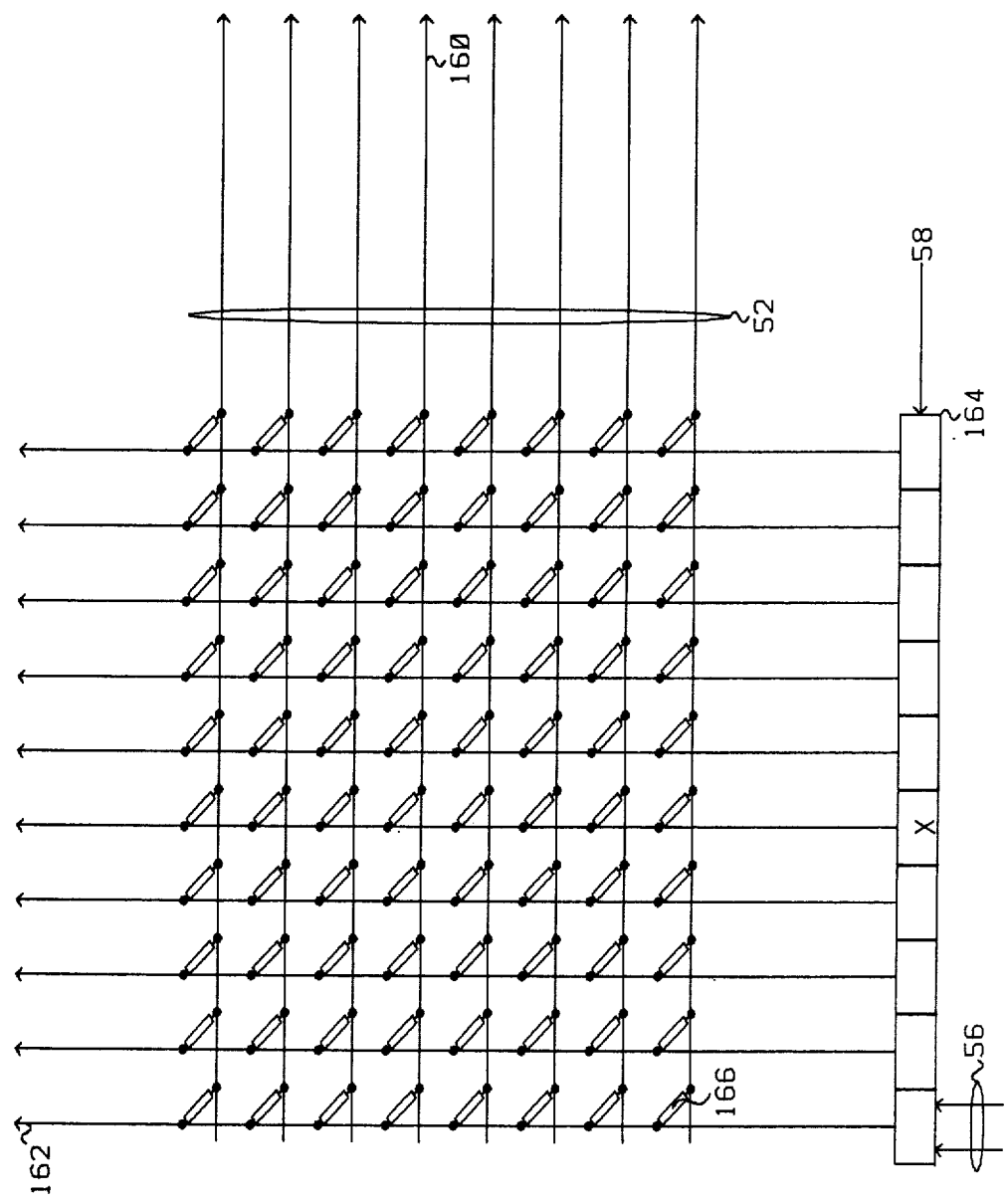
FIG. 8 illustrates a read-write memory for use in a storage section according to the present invention.

The second general memory embodiment is illustrated in FIG. 8. It is structurally very similar to the read-only memory shown in FIG. 7. It also includes a plurality of horizontal conductors of which 160 is typical. Each horizontal conductor 160 corresponds to one bit of a character stored in the memory. One such horizontal conductor corresponds to each of the conductors in memory data bus 52 shown in FIG. 3.

Similarly, this memory includes a plurality of vertical conductors of which 162 is typical. There is one such vertical conductor for each character stored in the memory. A specific character is selected for coupling to memory data bus 52 by applying a potential to the vertical conductor corresponding to that character. This potential is applied through a pointer register 164 operates in a manner analogous to pointer register 154 discussed with reference to FIG. 7, above.

In contrast to the memory shown in FIG. 7, each vertical conductor 162 is coupled to each horizontal conductor by a storage link 166. Each of the storage links 166 has two states. In the first state, a storage link has a first impedance which is sufficiently low to allow a current to pass. In this state, a potential applied to the vertical conductor coupled to said storage link will be coupled to the horizontal conductor coupled to said storage link. In the second state, each storage has a sufficiently high impedance to assure that any potential coupled to the horizontal conductor connected to said storage link will be distinguishable from the potential coupled when said storage link was in said first state. Each storage link may pass a current in at most one direction. The state of a given storage link is determined by applying appropriate signals to the horizontal and vertical conductors coupled to it. As will be described in detail below, a "write" control signal is may also be required.

Figure 9C:
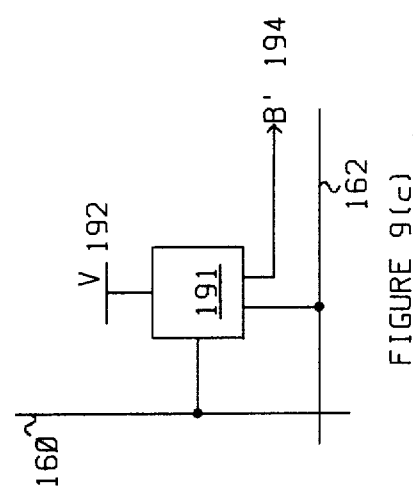
FIG. 9(c) illustrates a static RAM storage link for use in the memory shown in FIG. 8.
Figure 9B:
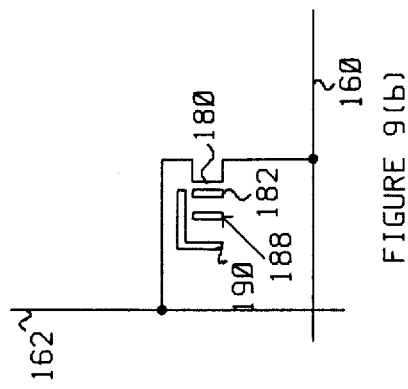
FIG. 9(b) illustrates EEPROM storage link for use in the memory shown in FIG. 8.
Figure 9A:
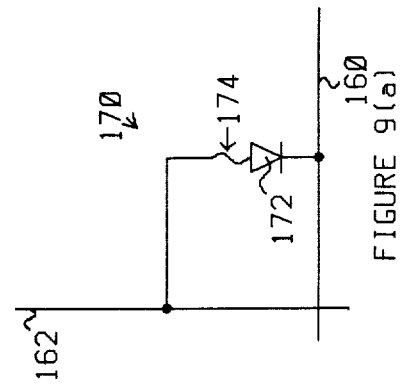
FIG. 9(a) illustrates a fusible link storage link for use in the memory shown in FIG. 8.

Three types of storage links are illustrated in FIG. 9. The first type of storage link will be referred to as a fusible link. A fusible link storage link is fabricated in one of the two states described above. After the content addressable memory is placed in operation, the storage link may be caused to enter the second state by applying a sufficiently large potential, referred to as the write potential, between the horizontal and vertical conductors to which it is coupled. This transition is irreversible. When the state of the storage link is to be "read", a lower potential is used. A typical fusible link storage link is shown in FIG. 9(a) at 170. The storage link consists of a diode 172 in series with a fuse 174. As fabricated, the fuse 174 is a low resistance path, typically constructed from a thin metal line on the surface of the silicon chip. When a sufficient current is caused to flow through the fuse, the metal line vaporizes, thus opening the circuit between the horizontal and vertical conductors coupled by the storage link.

Fuse links which are fabricated in the open condition and which are converted to the close circuit condition in response to a sufficient potential being applied thereto are also know to the art. For example, a fuse link consisting of a diode which passes current in a direction opposite to that of diode 172 shown in FIG. 9(a)- have been used to construct storage links. When a sufficient potential is applied across this diode, the junction breaks down forming a short circuit.

In a content addressable memory according to the present invention which utilizes this type of fusible link storage link, the write potential is distributed to each storage section on one of the conductors in bus 26 shown in FIG. 3. The write lines 74 and 80 may be used for this purpose. This write potential is coupled to each pointer 164 in response to write signal on write line 74 or write line 80. The pointer 164 shown in FIG. 8 places this potential on the vertical conductor corresponding to the select character. In this embodiment of the present invention, the output processor 60 shown in FIG. 3 also serves the function of the input processor 62. The output of AND gates 76 and 78 shown in FIG. 3 are also coupled to the input line 68 of the output processor 60. These alternative connections are not shown in FIG. 3. These connections will be discussed in more detail below with reference to FIGS. 11 and 12. In embodiments of the present invention which only contain fusible link or read-only storage links, the input processor 62 is absent. The control of the input processor 62 in embodiments which contain both fusible link and other writable storage links will be discussed in detail below. For the present discussion, we will assume that the input processor 62 is disabled during the writing of the fusible links.

During the writing of the fusible links, the output processor 60 is used to couple the horizontal conductors of the memory to the data lines 66 of bus 26 in the first active storage section. As a result, a current sufficient to change the state of any storage link in the selected character will be present in that storage link if the corresponding data line 66 is at ground potential. If the corresponding data line 66 is also at the write potential, no such current will flow in said storage link, and its state will not be changed.

Hence, the states of one or more storage links associated with the currently selected character in the first active storage section may be altered by applying signals to the data lines 66 in conjunction with a write potential on the vertical conductor corresponding to the selected character. In contrast to the signals normally applied on data lines 66, the signal applied during a write operation are at potential levels which substantially match that of the write potential on those data lines which correspond to storage links which are not to be altered.

A second type of storage link is illustrated in FIG. 9(b). This type of storage link uses a field effect transistor 180 similar to those used in EEPROM memory cells to couple the vertical and horizontal conductors. This storage link is similar to the fusible link storage sections described above in that it provides a path having two different impedances between the vertical conductor 162 and horizontal conductor 160 to which it is coupled. The impedance in question is determined by a charge stored on a floating gate 182 associated with said field effect transistor. The state of charge on floating gate 182 may be altered by applying an appropriate potential between the vertical and horizontal conductors while simultaneously applying the appropriate control potentials to the control gates 188 and 190. The control potentials in question are the same for all storage links in the selected character; hence the control potentials may be applied by the pointer 164 shown in FIG. 8. It will be apparent to those skilled in the art that second and third "vertical conductors" which are not shown in FIG. 8 must be added between the pointer register 164 and each storage link to accomplish this. In this embodiment of the present invention, each vertical conductor must be replaced by three vertical conductors. The first vertical conductor serves the functions described with reference to vertical conductors 162 in FIG. 8. The second vertical conductor couples an "erase" signal to the control gate 190 of each storage link corresponding to the selected character. And, the third vertical conductor couples a "write" potential to the control gate 188 of each storage link corresponding to the selected character.

The erase potential removes the charge from all of the floating gates 182 coupled to the currently selected vertical conductor. This initializes the storage links for writing. Specific storage links may then be written by forcing charge onto their floating gates. This is accomplished by applying a potential between the vertical and horizontal conductors to which they are coupled in coincidence with a potential on the write control gate 188. If no potential is present between the vertical and horizontal conductors when the write potential is applied, the state of the storage link is not changed.

In embodiments of the present invention which use the type of storage link shown in FIG. 9(b), a character is written into the selected character of the memory in the selected storage sections by coupling signals specifying the character in question from data lines 66 to the data bus 52 using the input processor 62. The pointer 164 applies a write potential to the "write" vertical conductor corresponding to the selected character in response to a signal on line 58 shown in FIG. 3. This write potential may be provided on a separate conductor of bus 26 which is not shown in FIG. 3.

A separate erase instruction is also needed in these embodiments. I will be apparent to those skilled in the art that such an instruction may be implemented by adding an additional conductor to bus 26 and providing an AND gate which generates a signal in response to a signal on said conductor in the first active storage section.

An embodiment of the present invention which employs this type of storage link has the advantage of allowing the contents of the memory to be updated while still providing non-volatile storage for the data stored therein. This eliminates the need to store the data in a separate permanent storage system when power is removed from the host data processing system and the time needed to copy the data records back into the present invention when the host data processing system is again turned on.

The third storage link which is illustrated in FIG. 9(c) is a static RAM memory cell of the type normally used in computer memories. The storage link 190 has two states. In the first state it couples a potential present on a "power rail" 192 to the horizontal conductor 160 in response to a potential on the the vertical conductor 162. In the second state, no such potential is coupled in response to said potential on the vertical conductor. In this sense, it behaves like the other storage links discussed above.

The state of the storage link 190 is set by applying a signal to the horizontal conductor 160 in coincidence with the complement of said signal on a control line 194. The horizontal conductor 160 and control line 194 are normally referred to as "bit lines" in conventional static memory circuits. When the storage link is not being so written, control line 194 is coupled to ground through an appropriate load. One such control line is required for each horizontal conductor 160. That is, when such a storage link is used, each of the horizontal conductors 160 shown in FIG. 8 is replaced by two conductors. In addition, a means for applying the complement of the signals on each horizontal conductor 160 to the associated control line 194 in response to a write signal on line 58 shown in FIG. 3 must be provided. Circuitry for providing these signals will be apparent to those skilled in the art.

Embodiments of a content addressable memory according to the present invention which employ this type of storage link have the advantage of allowing any character to be written repetively without requiring that the character first be erased. In addition, the time to write such a static RAM storage link is much less than that required to write an EEPROM cell of the type shown in FIG. 9(b). Finally, the number of times the storage link may be written is much greater than currently available EEPROM storage links which malfunction after typically 10,000 write operations. A content addressable memory using this type of cell, however, requires significantly more silicon area per data word than one employing a fusible link storage link. In addition, the data stored in the content addressable memory will be lost if power is removed from the content addressable memory. Hence, a permanent storage location for the data words must be provided in the host data processing system.

Figure 10:
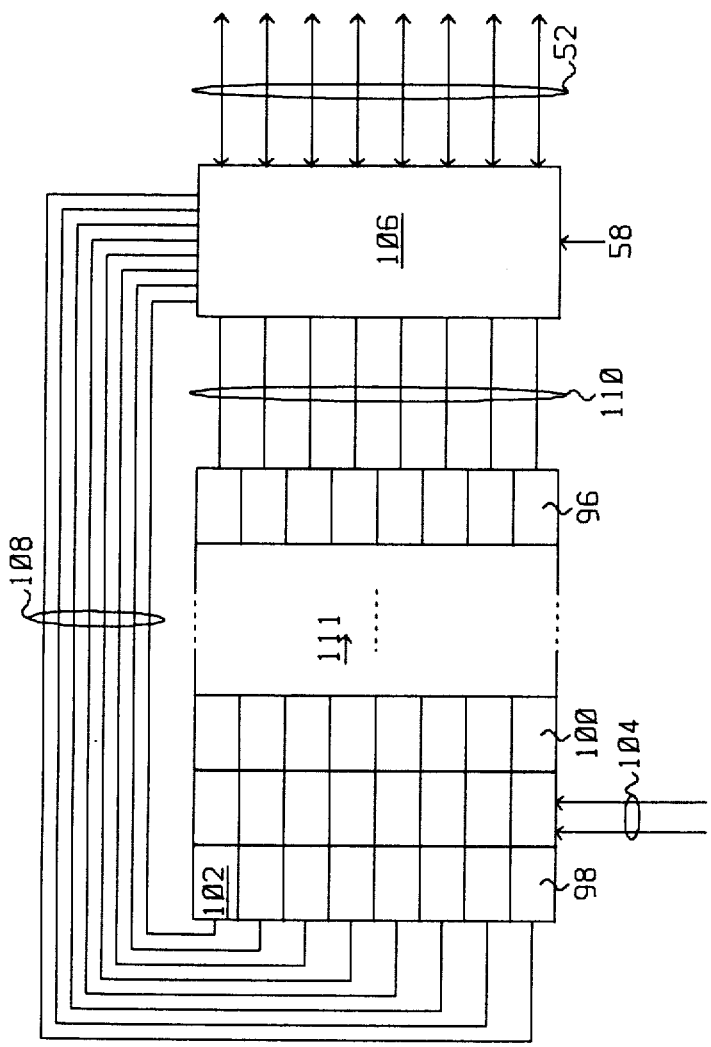
FIG. 10 illustrates a shift register based memory for use in a storage section according to the present invention.

A third general type of memory which may be used for the memory and pointer functions shown in FIG. 3 at 50 is illustrated in FIG. 10. This memory is analogous to that described with reference to the FIG. 9(c) above in that it may be rewritten repetively without damage in a time which essentially equal to that required to read a character from the memory. In addition, it has the advantage of requiring less silicon area per bit stored than a standard static RAM memory cell.

In this embodiment of the present invention, each data word is stored in a shift register having one storage location per character. Each storage location consists of W storage cells 102 corresponding to the W bits of a character. The storage locations are organized into an ordered array in which the storage cells corresponding to the same bit position in each character are coupled together. The shift register has a first storage location 96, a last storage location 98, and one or more intermediate storage locations 100. Each storage cell includes an input means for receiving signals specifying a bit to be stored therein and an output means for coupling signals specifying the bit currently stored therein. These input and output means operate in response to a shift signal on shift lines 104. The input means of each storage cell is coupled to the output means of the preceding storage cell, except for the last storage cell.

The input means of the last storage location is coupled to a routing switch 106 by a bus 108. The output means of the first storage location is also coupled to routing switch 106 by bus 110. The routing switch has two states which are specified by the signal on line 58 shown in FIG. 3.

In the first state, routing switch 58 couples each conductor in bus 110 to the corresponding conductor in bus 108. This has the effect of causing the data stored in the shift register to circulate around a loop comprising the shift register and buses 108 and 110 when a shift signal is received on shift lines 104. The direction of data flow is indicated by the arrow at 111. Upon receipt of a shift signal on shift lines 104, the character stored in the last storage location is shifted such that it is now stored in the next to the last storage location. The character which was previously stored in the next last storage location being shifted to the right into the adjacent storage location, and so on, the character stored in the first storage location being shifted into the last storage location. In this first state, routing switch 106 also couples the signals present on each conductor in bus 110 to a corresponding conductor on data bus 52 shown in FIG. 3. This has the effect of placing signals specifying the character currently stored in the first storage location 96 onto the data bus 52. This first state is specified unless a character is to be written into the shift register.

In the second state, the routing switch couples the signals present on data bus 52 onto bus 108 while interrupting the connections to the corresponding conductors in bus 110. When a shift instruction is given by applying shift signals to the shift lines 104, the character stored in each storage location is replaced by the character stored in the previous storage location, except for the last storage location. The character stored in the last storage location 98 is replaced by the character on data bus 52 and the character stored in the first storage location is lost.

Two shift lines 104 are shown in FIG. 10 because shift registers, in general, require signals on two lines in a specific temporal relationship to function. The shift lines 104 are analogous to the character select lines shown at 56 in FIG. 3. However, instead of specifying the position of a pointer, these signals shift the data words one location in the shift register. In this embodiment, a character is selected by positioning it such that it is stored in the first storage location 96 in the memory.

This shift register embodiment of the present invention has the advantage of requiring less silicon area to fabricate than the above described memory embodiments. Shift register storage cells requiring only three transistors per storage cell are known to the art. In contrast, a static RAM cell requires at least four transistors. In addition, the shift register does not require a pointer register to define the selected character. This also reduces the silicon area required to fabricate the memory.

Although the shift register embodiment has these advantages, it is, in general, only useful in a content addressable memory in which all storage sections have memories of the same size. It must be remembered that all storage sections shift their selected character together in the present invention. Hence, when one shift register is shifted, all other shift registers are also shifting. Consider a content addressable memory in which there are two different length shift registers which are all aligned such that the first character of each stored data word is in the first storage location of each shift register. Assume that smaller size shift registers have N storage locations. After N+1 shift instructions, the smaller shift registers will be aligned such that the first character of the data word is again in the first storage location. However, the first storage location in the larger shift registers will contain the (N+1) character of the data words stored therein. Once the data stored in the shift registers becomes misaligned in this manner, the memory will malfunction.

As pointed out in the above examples, it is often useful to reserve a small number of characters in each storage section as a scratch pad for marking those data words which satisfy some intermediate matching characteristic during processing. Such markings provide a means for rapidly re-activating a class of data words which were selected in some previous processing operation. Such a scratch pad can be easily provided in those content addressable memories according to the present invention which use either the shift register storage means discussed with reference to FIG. 10 or the storage link embodiment discussed with reference to FIG. 8 and FIG. 9(c). In these cases, data words are merely stored in each storage section starting with the second or third storage location in the memory associated with the storage section in question. However, in a content addressable memory according to the present invention which employs one of the memory embodiments which does not allow a character to be repeatedly stored or in which the time needed to store a character is long compared to the time needed to write a character, this approach is not efficient.

Figure 11:
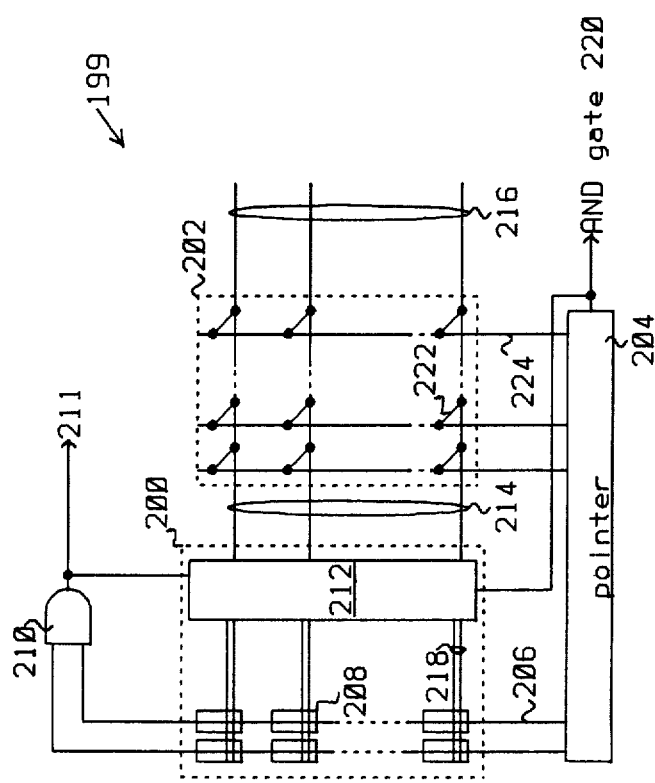
FIG. 11 illustrates a memory having both readwrite elements and limited write elements for use in a storage section according to the present invention.
Figure 12:
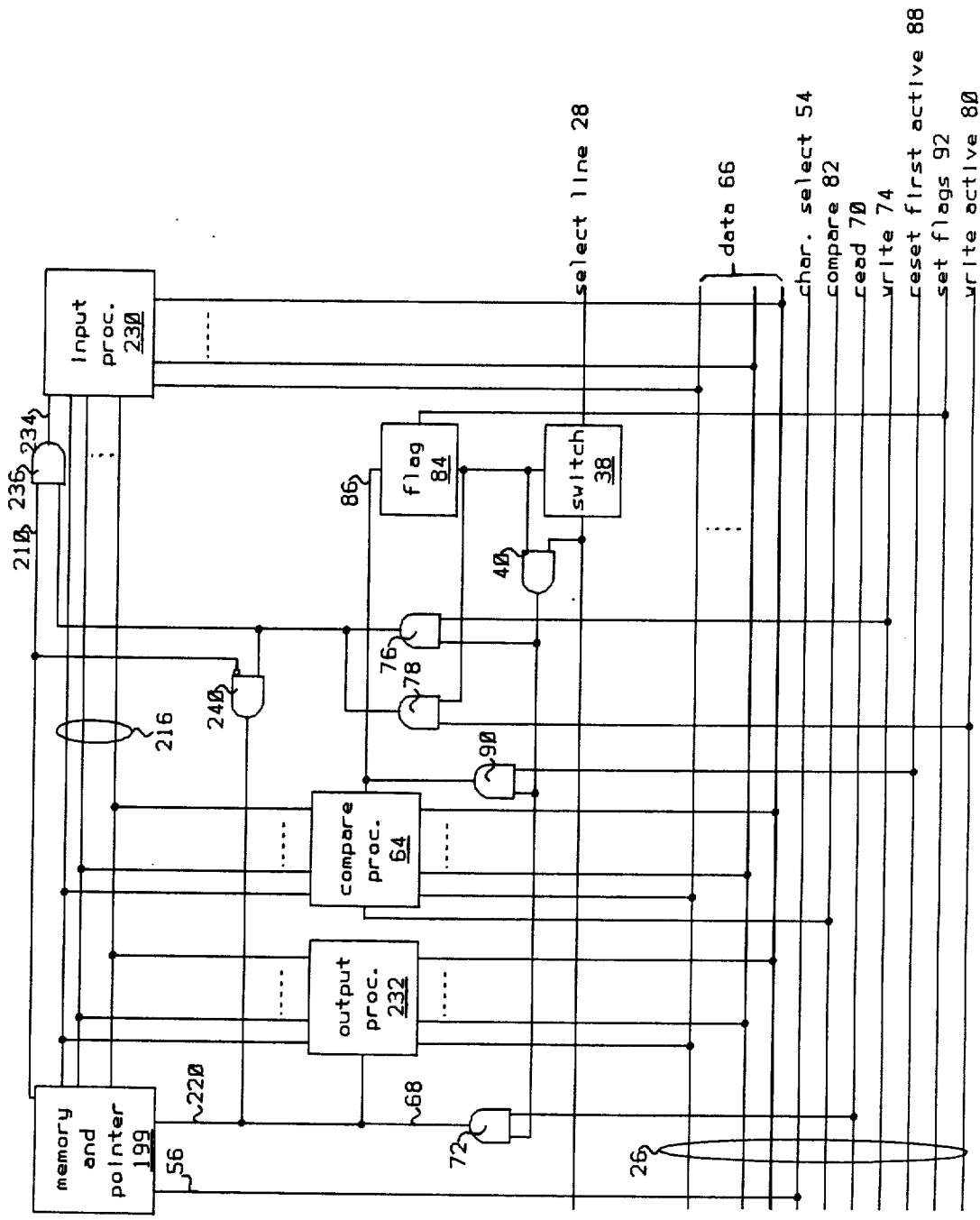
FIG. 12 illustrates a storage section according to the present invention which utilizes the memory shown in FIG. 11.

An embodiment of the present invention which provides such a scratch pad in conjunction with a memory having at most limited writing capabilities is illustrated in FIGS. 11 and 12. FIG. 12 illustrates a memory 199 for use in a storage section according to the present invention. The memory includes both a scratch pad memory 200 and a mostly read memory 202. For the purposes of this discussion, the mostly read memory 202 will be assumed to be of the fusible link type discussed with reference to FIGS. 8 and 9(a), and the scratch pad memory 200 will be assumed to be of the type discussed with reference to FIGS. 8 and 9(c).

The scratch pad memory 200 includes storage for two characters. Other numbers of characters will be apparent to those skilled in the art. These characters are selected by a pointer 204 when the pointer is directed to select the first and second storage locations in the storage section in which it is located. The pointer selects one of these locations by coupling a potential to the vertical conductor 206 which passes through the read-write storage cells 208 associated with the character in question. An AND gate 210 detects the selection of one of these two characters and generates a signal which enables a memory control circuit 212. The output of AND gate 210 is also coupled to the processing circuitry in the storage section in which memory 199 is located on a signal line 211.

Control circuit 212 generates the necessary control signals and voltage levels for coupling the storage cells 208 to an internal memory bus 214 which is an extension of memory data bus 216. When a character present on memory data bus is to be written into one of the storage locations in the scratch pad memory 200 in response to a signal on a write enable line 220, control circuit 212 places the appropriate potentials on the bit lines 218 which couple each storage cell 208 to the corresponding conductor in memory data bus 216. When a character is to be read from one of the storage locations in the scratch pad memory 200, control circuit 212 sense the potential on the bit lines 218 and generates the appropriate potentials on the corresponding conductors in bus 214 which is coupled to the memory data bus 216. Control circuits of this type are well known to those skilled in the computer memory arts.

The mostly read memory 202 is used to store a data word. The mostly read memory 202 consists of a plurality of storage links 222. Initially, each storage link 222 couples a vertical conductors 224 to each horizontal conductor in memory data bus 216. Selected ones of these couplings are eliminated by applying a sufficiently large "write" potential accross the selected coupling in question as described above. This write potential is coupled to the vertical conductor 224 by the pointer 204 in response to a signal on write enable line 220. As noted above, the write potential in question may be coupled to the pointer 204 on the write enable line 220. A storage locations in the mostly read memory 202 are selected for reading or writing when the pointer 204 is directed to select storage locations which are more than two storage locations from the beginning of the memory in the storage section in which said pointer is located.

FIG. 12 illustrates a storage section according to the present invention which incorporates the memory 199 illustrated in FIG. 11. This storage section operates in a manner which is very similar to the storage section shown in FIG. 3 discussed above. Hence, each element which performs the same function as a corresponding element show in Figure is numbered with the same number used in FIG. 3. The main differences between the storage sections illustrated in FIGS. 3 and 12 lie in the control of the input and output processors during writing operations. The input and output processors are labeled 230 and 232, respectively, in FIG. 12.

Input processor 230 couples the memory data bus 216 to the corresponding data lines in bus 26 in response to a signal on line 234. This allows signals specifying a character to be stored in the scratch pad memory 200 shown in FIG. 11 to be coupled to scratch pad memory 200 by control circuit 212. A signal is generated on line 234 by AND gate 236 which responds to coincidence of a signal on line 211 and a true output from either AND gate 76 or AND gate 78. Line 211 is coupled to AND gate 210 in the memory 199. A signal will be present on line 211 whenever the pointer in memory 199 selects a character in the scratch pad memory 200. AND gates 76 and 78 sense write commands which are to be acted upon by the storage section in which they are located. Hence, input processor 230 will only be enabled on a write command directed to a storage location in the scratch pad memory 200 shown in FIG. 11.

As discussed above with reference to fusible link memory embodiments, output processor 232 is used to couple signals specifying the character to be written into the mostly read memory 202 to the memory 199 when a character to be stored in a fusible link memory location is to be written into that location. Output processor 232 is also used to couple signals specifying any character in the memory 199 to the corresponding data lines 66 of bus 26 during a read instruction.

Output processor 232 is enabled by a signal on line 220. Such a signal is generated either by a read instruction through AND gate 72 or a write instruction through AND gate 240. AND gate 240 generates such a signal in response to a true output from either AND gate 76 or AND gate 78 in the absence of a signal on line 210. Hence, such an enable signal will be generated whenever a write instruction directed to a memory location in the mostly read memory 202 in memory 199 is t be executed by the storage section in question.

Although the above example of a "mixed memory" has been given with reference to a memory having a read-write memory and a fusible link memory, it will be apparent to those skilled in the art that other forms of read only or mostly read memories may be combined. In those embodiments which read only memories are used, AND gate 240 can be eliminated. Those embodiments which employ a mostly read memory based on EEPROM storage cells will need to employ an appropriate control circuit to provide the control signals and sense amplifiers normally used in conjunction with such memory cells. Such circuitry is well known in the memory arts and, hence, is not discussed here.

It should be noted that the silicon area needed on a chip for storing the data words is much larger than the silicon area needed for the various processing functions. A typical content addressable memory for use in a data base retrieval system, each data word will have in excess of 100 characters which are preferably 8 bits wide. Hence the space needed to store the data word is at least that needed to store 800 bits. If a conventional static RAM cell is used for each bit, this corresponds to more than 3200 transistors. In the simple processor in which the nonnumerical compare instruction is used, less than 200 transistors are needed to implement the various input, output, compare, and instruction decoding operations. Hence, the present invention meets the objective of providing a memory in which the processing circuitry is a small fraction of the circuitry needed to store the data words.

4. Construction of Large Memories According to the Present Invention

A large content addressable memory according to the present invention may be constructed from a linear array of memory chips and a controller chip. Such an array is shown at 280 in FIG. 5. Each memory chip 282 contains a plurality of storage sections 283 coupled to each other by a select line 286 and a bus 284. The select line 286 which runs through each memory chip 282 has two pins, an input pin 288 for receiving a signal from the adjacent memory chip 282 which is closest to the controller chip 92, and an output pin 290 for communicating a signal from it to the next memory chip 282 in the linear array. The bus 284 leaving the controller chip is connected to all the memory chips in the linear array. A select line output line 286 is connected to the select line input pin 288 of the first memory chip 282 in the linear array. The select line output pin 296 of the last memory chip 282 in the linear array is connected to the controller by a signal line 298. The controller 292 communicates with the host data processing system over a bus 300 which includes signal lines for communicating a character between the controller 292 and the host data processing system and signal lines for communicating the control codes used to specify which of the above described instructions is to be carried out. In the preferred embodiment, each character is 8 bits wide and corresponds to the standard 8-bit ASCII character set. Embodiments which employ different width characters will be apparent to those skilled in the art.

It should be noted that the present invention does not use addresses either internally or externally to select a storage section. In addition to reducing the amount of circuitry in each of the memory chips 283 by removing the need to decode addresses, this design allows a content addressable memory having an arbitrary number of storage sections to be constructed. Furthermore, the size of the content addressable memory can be increased at any time merely by inserting one or more chips 282. This is accomplished by removing line 296 from the last chip 282 and connecting one or more chips 282 to the last chip by connecting each new chip to bus 284 and the select line output of the previous chip to the select line input of each new chip. The select line output of the last chip is then connected to controller 292 by signal line 298. No other changes in hardware or software need be made. It should also be noted that different memory chips 282 could have different numbers of storage sections without affecting the operation of the content addressable memory. So long as the total number of storage sections in the content addressable memory is sufficient to store all of the desired data words, the content addressable memory is independent of the number of storage section in any single chip 282. As will be explained in detail below, this allows memory chips having one or more defective storage sections to be used.

The above analysis assumes that the select line 28 shown in FIG. 2 will function properly independent of the number of storage sections in the content addressable memory. If the switches 38 have a zero impedance when closed, this will be the case. Unfortunately, such ideal switches do not exist.

Consider a content addressable memory having several millions of storage sections. Suppose that the first active storage section is one million storage sections from the beginning of the content addressable memory and that the next active storage section is separated from the first active storage section by another million storage sections. When the flag in the first active storage section is reset, the section of the select line between this storage section and the next active storage section must be charged to the potential on the select line before the next active storage section will recognize that it is now the first active storage section. If each closed switch has an impedance of only one ohm, the time to charge this section of the select line can be quite long, since the current available to charge it is less than a microampere in this case.

Figure 14:
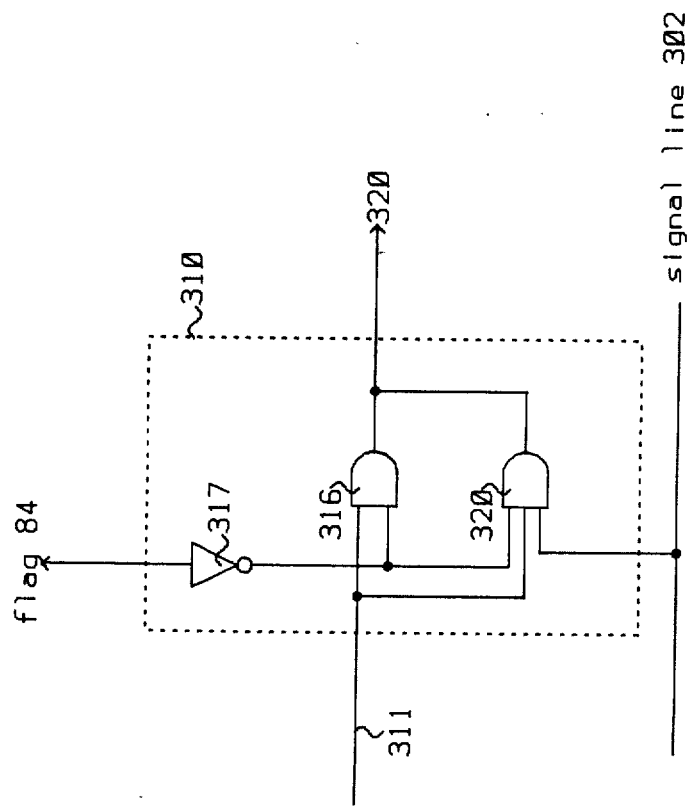
FIG. 14 illustrates an improved switch for use in a storage section according to the present invention.

This charge time may be effectively eliminated by modifying bus 26 and adding some additional circuitry to each switch 38 shown in FIG. 3. These additional features are illustrated in FIG. 14. A signal line 302 is connected to the select line 28 at the point 27 at which the select line enters the first storage section 18 shown in FIG. 1. In general, the controller 19 places a DC potential on the select line at this point. Referring again to FIG. 14, each of the switches 310 has an input side 311 which receives a signal from the preceding storage section and an output side 320 which transmits a signal to the storage section following said switch 310 when switch 310 is closed. Each switch 310 consists of an AND gate 316 which performs the switching function in response to flag 84. Since the switch is "closed" when the output of the flag is "false", an inverter 318 is included in the switch. A second AND gate 320 is incorporated in each switch. This AND gate effectively shorts the output side 302 of the switch 320 to the signal line 302 when the flag is not set and there is a signal on the input side 311 of the switch 320.

This shorting action effectively eliminates the impedances of all of the closed switches between the first active storage section and the beginning of the content addressable memory. Hence, when the flag in the first active storage section is reset, the select line between this storage section and the next active storage section will be charged through the signal line 302. This charge path has a very small impedance since it contains only one AND gate.

Figure 13:
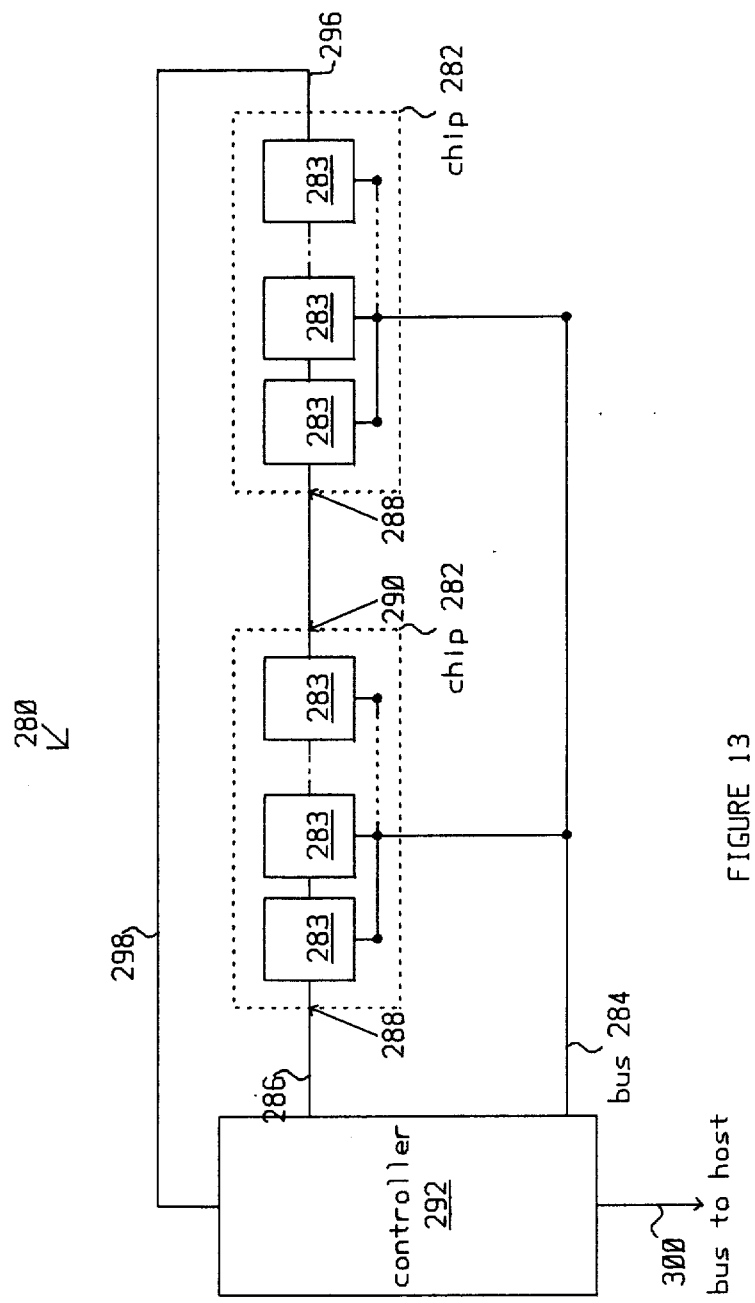
FIG. 13 is a block diagram of a large content addressable memory constructed from a plurality of memory chips according to the present invention.

The cost of a large content addressable memory according to the present invention is determined mainly by the cost of the memory chips 282 shown in FIG. 13. In high volume production, the cost of a chip is substantially independent of the number of storage sections on the chip. Hence, one wishes to incorporate as many storage sections on a chip as possible. The number of storage sections which may be incorporated on a given chip is determined by the error rate in the fabrication process.

In conventional VLSI chip fabrication, random errors which would render a chip useless occur at a finite rate which is essentially a constant times the area of the chip. If a chip contains such a fabrication error, it normally must be discarded. Hence, the maximum size of a chip is set such that the probably of such a fabrication error is substantially less than one. If the effective error rate could be reduced, larger chips could be fabricated. A minor modification of the storage section shown in FIG. 3 allows such a reduction in the effective fabrication error rate.

The method by which this improvement operates may best be understood with reference to a simple example of a fabrication error which can be effectively removed from a content addressable memory according to the present invention. Referring again to FIG. 1, assume that a fabrication error rendered the memory 20 in one of the storage sections 18 in the content addressable memory inoperative. A chip containing such an error could not be used to construct a large content addressable memory, since sooner or later that storage section would be selected to store data which would then be lost due to the fabrication error. However, if this fabrication error could be detected and the storage section in question excised from the chip, the chip would be usable. It would, of course, have one less storage section. But, as pointed out above, a content addressable memory according to the present invention easily accomodates chips having different numbers of storage sections. Hence, the loss of one storage section is of little consequence. The improvement to the present invention is a means for effectively excising a given storage section from the content addressable memory at any time.

Referring again to FIG. 2, a storage section 18 in which the flag 36 is prevented from indicating the active state for that storage section is effectively removed from the content addressable memory. If the storage section can not enter the active state, it will not be selected either for reading or writing. Hence, any fabrication errors which do not effect the bus 26 or the operation of the select line 28 can be effectively eliminated by "permanently" resetting the flag in storage section in which the fabrication error occurred. A means for providing this permanent reset function is illustrated in FIG. 15.

Figure 15:
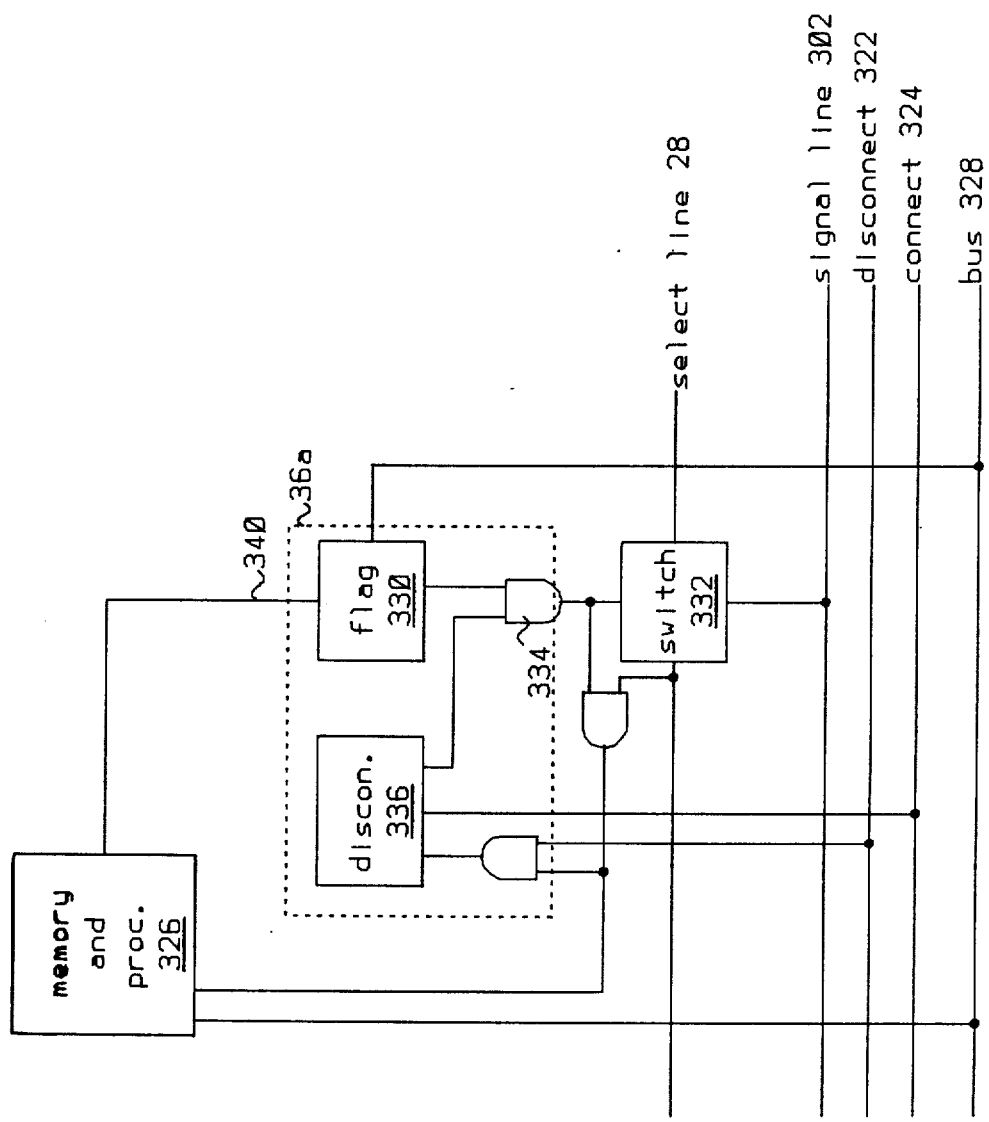
FIG. 15 illustrates circuitry for disconnecting and deactivating a storage section according to the present invention from the content addressable memory in which said storage section is located.

Referring now to FIG. 15, in each storage section, the flag 36 shown in FIG. 2 is replaced by a flag circuit shown at 36a. In addition, two additional signal lines 322 and 324 have been added to bus 26. For clarity, the remaining circuitry in the storage section is indicated by a memory and processor shown at 326, and the other conductors of bus 26 are shown as a single bus at 328.

The flag circuit 36a includes a flag 330 which serves a function analogous to that served by flag 36 in FIG. 3. The flag 330 is set indicate an active state by a signal on a set flags line in bus 328 and is reset on a line 340 by the processor in response to those conditions which caused the flag 36 shown in FIG. 3 to be reset. The flag 330 is preferably a set-reset flip-flop. The output of the flag 330 controls switch 332 through AND gate 334. Switch 332 serves the same functions as switch 310 shown in FIG. 14. That is, it interrupts the select line 28 in response to a signal from the flag 330. It also includes the shorting circuitry discussed with reference to FIG. 14 above The flag circuit 36a also includes a one bit memory cell 336 having an output which forms the second input of AND gate 334 When the memory cell 336 stores a "1", AND gate 334 couples the output of the flag to switch 332. When memory cell 336 stores a "0", AND gate 334 prevents the output of the flag 330 from reaching switch 332. This has the effect of disconnecting the storage section in question from the content addressable memory, since the flag circuit 36a will, in effect, indicate the inactive state for the storage section so long as the one bit memory cell 336 stores a "0".

The content of memory cell 336 is determined by signals on the two added bus lines 332 and 334. A signal on bus line 324 causes the memory cell 336 in all storage sections to store a "1". This signal is generated by the controller in response to a "connect" instruction. This signal enables the flag 330 in each storage section in the content addressable memory. A signal on bus line 332 causes the memory cell 336 in the first active storage section to store a "0". This signal is generated by the controller in response to a "disconnect" instruction. It has the effect of disconnecting the currently first active storage section from the content addressable memory. The storage section will remain disconnected until a connect instruction is executed.

The connect and disconnect instructions may be used to remove malfunctioning storage sections at any time. A procedure for accomplishing this will now be described. It will be assumed that the content addressable memory uses memories which can be read and written an indefinite number of times and the entire content addressable memory is empty at the beginning of this procedure. First all of the storage sections in the content addressable memory are connected to the bus and made active by issuing a connect command and a set flags instruction.

The first active storage section is tested by writing two predetermined data words into it. After each data word is written, the data word is read back to assure that it was correctly stored and that the storage section is capable of read out. The two data words are chosen so as to test the ability of each bit in the memory associated with the storage section in question to store both a "1" and a "0". If both words are correctly written and read, a reset first active instruction is given to reset the flag in the first active storage section. To test that this flag has in fact been reset, the data word in the storage section which is now the first active one is read. If this data word matches the last word written into the first active storage section in the above test, the flag in that storage section did not reset. This indicates that the flag itself is defective. In should be noted that a storage section having a flag which is defective by reason of not being able to be set is already effectively removed from the content addressable memory.

If either of the data words is not correctly read or written, or if the flag in the storage section was defective, the storage section is disconnected by issuing a disconnect instruction which stores a "0" in the one bit memory cell of the first active storage section. This should disconnect the storage section in question from the memory. To test that this has in fact occurred, the contents of the now first active storage section are again read. If they match the last word written to the memory, the storage section has not been disconnected. This indicates that the chip has a defective switch 332 or some other non-correctable error and must be discarded.

If the storage section in question disconnects properly, or if it passed the read/write and reset flag test described above, the next storage section is tested in the same manner. This process is repeated until all storage sections have been tested. At the end of the test, only fully functional storage sections will be present in the content addressable memory. It should be noted that this test can be repeated at any time during the life of the content addressable memory. Thus the present invention can, in effect, self repair when a storage section becomes inoperative because of a latent fabrication error which disables the content addressable memory after it has been put into operation.

The memory cell 336 is preferable a fusible link memory cell. This allows the defective storage sections to be permanently removed from the content addressable memory without the need to repeat the diagnostic and disconnect program described above on the disconnected storage sections each time the content addressable memory is tested. The use of a fusible link also eliminates the bus conductor 324 used to "connect" all of the storage sections to the bus 28, since a memory cell based on a fusible link can be fabricated such that it stores a "1" until the disconnect signal is received. Embodiments in which the memory cell 336 is an EEPROM memory cell or a set-reset flip-flop will be apparent to those skilled in the art.

The above procedure must be modified somewhat in content addressable memories which employ write-once memories based on fusible links or the like. Since a fusible link may only be written once, a given storage section may not be tested for its ability to properly store and retrieve data until the controller actually stores the data specifying the data word that is to be stored in the storage section. Hence, each time the controller attempts to store a data word in a storage section, it immediately reads back the data word in question to determine if it was properly stored. If it was not, the controller merely disconnects the storage section in question by issuing a disconnect command and repeats the operation with next free storage section.

This disconnect procedure is particularly important in content addressable memories based on fusible links. Write-once memory systems based on fusible links have been known to the art for some time. Since the silicon area required to fabricate a fuse link in series with a diode is much less than that required to fabricate a conventional memory cell, such memories, in principle, offer significant advantages. However, in spite of these advantages, write-once memory systems based on fuse links are not normally used, because of the lack of reliability of the individual fuse links. Because of inconsistancies in fabrication, an occasional fuse link will not blow when it is subjected to a "write potential". It is impossible to ascertain in advance if any such defective fuse link is present in a memory. Such fabrication errors may only be detected by attempting to blow the fuse link and finding that it will not blow. In a conventional memory, such errors are "fatal", since there is no efficient method for noting that a particular word in the memory is defective and directing read-write instructions intended for that word to an alternate location. The present invention has no such limitation, since the defective storage section may be disconnected from the content addressable memory.

It should be noted, that the such a disconnect scheme is only effective in a memory system which does not use addresses. In a conventional memory system, merely removing a defective memory cell is ineffective, since one must keep track of the fact that data which was to be stored in this memory cell is now stored at a specified second address. The only workable method of doing this in the prior art requires that large sections of the memory, including many good storage locations, must be removed.

Finally, it should be noted that most of the silicon area is used for storing data words. Hence, most of the fabrication errors will occur in the memory sections. As a result, most of the fabrication errors may be removed by this disconnect scheme.

5. A Pattern Recognition Memory

The above embodiments of the present invention may be further expanded to provide a memory system for use in pattern recognition problems. There are a number of pattern recognition problems in which an "unknown pattern" representing an event or object of unknown origin must be compared with similar patterns from known events or objects in order to classify the unknown pattern. Each of the "patterns" consists of a number of parameters. Each parameter is, in general, a number which represents a measurement or some other data about the object or event. The difference between two patterns is typically measured by a distance function of some form. A commonly used distance function, D(U,K), is defined by the following relationship $$D(U,K) = \sum_{i=1}^{N} W(K,i)*[U(i) - K(i)]^2, \quad (1)$$

where, U and K are two patterns, U(i) and K(i) respectively representing the ith parameters of the two patterns in question and W(i) is a weighting function. Each pattern has N parameters. In general, the weighting function W(K,i) may be different for different patterns, K. The weights assigned to each parameter provide a means for taking the relative importance of each parameter into account. If the parameters are of equal importance in all of the known patterns, the weight function W(K,i) may be omitted. The "unknown" pattern, U, is said to match the "known" pattern, K, if D(U,K) is less than some predetermined value.

Figure 16:
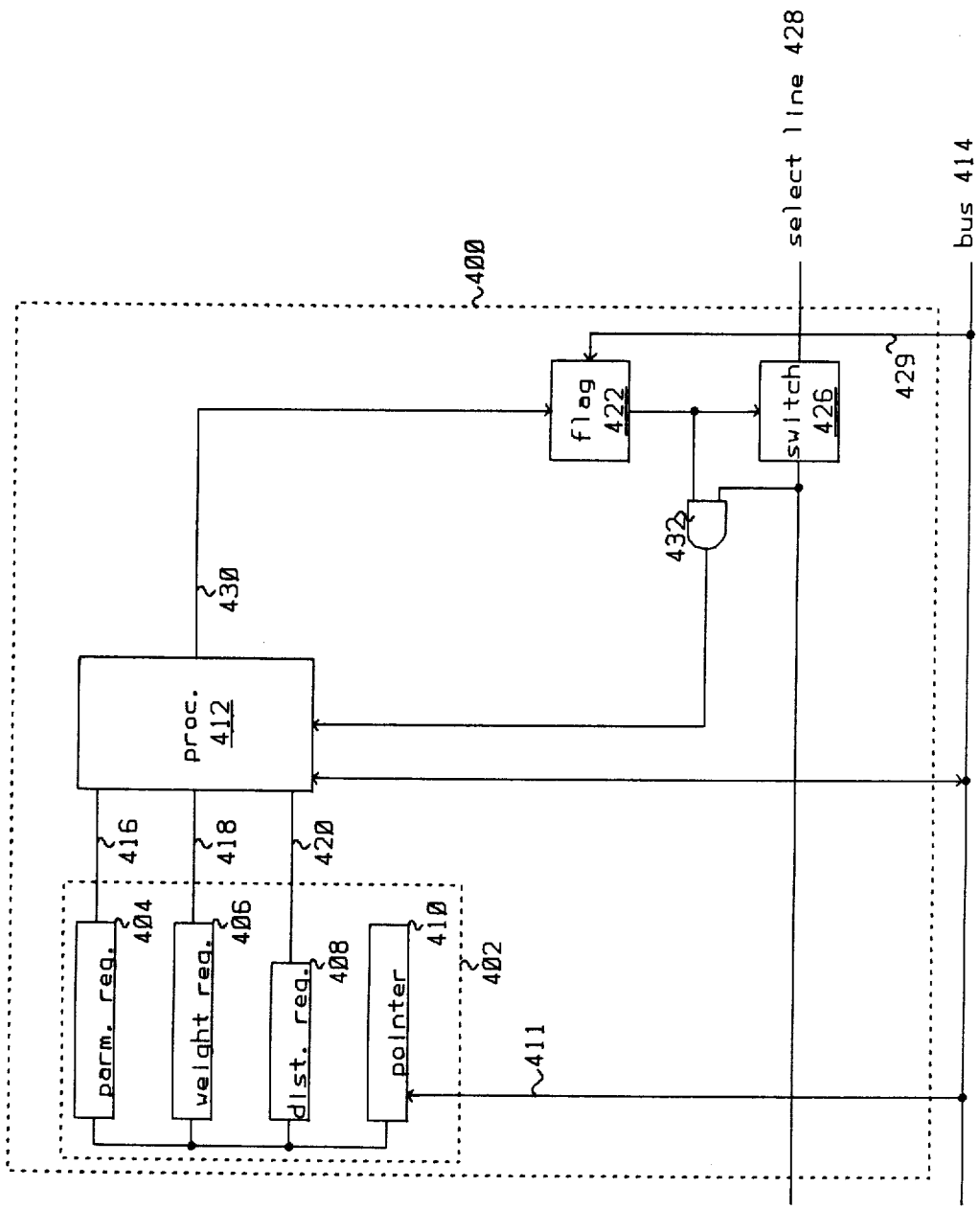
FIG. 16 illustrates a storage section according to the present invention for performing pattern matching functions.

It will be apparent to those skilled in the art that a number of other distance functions could be used to characterize the difference between the two patterns. The present invention is directed to any distance function which may be calculated from a sum of terms in which each term involves only the a parameter stored in the storage section, including a weight value associated with that parameter, and a parameter from the unknown pattern There are a number of such pattern recognition problems in which the number of known patterns is very large. In such cases, a practical computer for classifying a known pattern using the relationship in Eq. (1) is greatly needed. A block diagram of a storage section according to the present invention which may be used to provide this classification ability to a host data processing system is illustrated in FIG. 16. A plurality of these storage sections may be combined to form a content addressable memory according to the present invention in accordance with the embodiments discussed above.

Refering now to FIG. 16. Each storage section 400 includes a memory 402 which is used to store a pattern, a weight function, and a distance value. The pattern is stored as a "data word" in a pattern register 404. The pattern register 404 consists of an ordered array of storage locations. Each storage location stores one parameter of the pattern. In effect, a "parameter" in this embodiment of the present invention is equivalent to a character in the embodiments discussed above.

The weight function is stored in a similar storage register, referred to as the weight register, which is shown at 406. The ith storage location of the weight register 406 is used to store the value of W(i) in Eg. (1) which corresponds the ith parameter stored in the parameter register 404. In general, there will be the same number of storage locations in the parameter register 404 as there are in the weight function register 406. However, embodiments having some additional storage locations in the parameter register 404 which are used as "scratch pad" space will be apparent to those skilled in the art.

The distance value is stored in a third register 408, referred to as the distance register. Each storage location in the distance register preferably has the same number of bits as each storage location in the patter register 404 and weight register 406. The number of storage locations in the distance register 408 will depend on the mode of storing the parameters of the pattern and the weights, W(i).

The number of bits in each storage location must be sufficient to store the number representing the parameters used to construct any pattern. A 32-bit wide storage location is preferred. This provides sufficient space to store each value as a floating point number. In the preferred embodiment, the parameters, weights, and distance value are stored as such floating point numbers. In this case, a single storage location distance register is sufficient. In embodiments in which the parameters, weights, and distance value are stored as integers, more storage locations may be needed in the distance register, since the sum shown in Eq (1) may exceed the capacity of a single storage location. For the purposes of the present discussion, the distance register 408 will be assumed to have one storage location. Modifications of the present invention in which the distance register 408 includes a plurality of storage locations will be evident to those skilled in the art from the following discussion.

A value stored in one of these three registers may be specified by giving the register in which it is located and the location of the storage location in which it is stored relative to the beginning of that register. Each memory 402 includes a pointer 410 which specifies a location relative to the beginning of each of the registers. The location is pointed to in each register. In embodiments in which the distance register 408 contains a single storage location, the storage location in question is always specified even when the pointer 410 points to a storage location greater than one.

In embodiments in which the distance register 408 is more than one storage location long, the pointer is also used to specify a location in said distance register. If the pointer 410 specifies a location which is not in the distance register 408, a default value may be generated as described above with reference to the previously described embodiments of the present invention. A separate pointer included in the processor 412 is used to access this distance register 408 when a term in the sum shown in Eq. (1) is to be added to the value in the distance register 408. Because of this additional complexity, embodiments in which the distance register 408 is a single character are preferred.

The signals specifying the values stored in the storage locations of the pattern register 404, weight register 406, and distance register 408 specified by the pointer 410 are coupled a processor 412 which performs the various mathematical and input/output operations which are required to compute the distance function given in Eq. (1) and to select known patterns which are within a predetermined distance of an unknown pattern. The processor 412 operates under the control of a controller which is not shown. The controller communicates with the processor 412 over a bus 414. Each processor 412 in the content addressable memory has as inputs a number of control signals which are communicated to all processors simultaneously on bus 414 over a plurality of conductors in said bus.

Bus 414 also includes a one or more conductors which are used to communicate a data value such as the value of one of the parameters of the unknown pattern which is to be matched. These conductors are analogous to the data lines 66 in bus 26 shown in FIG. 3. The value transferred on these conductors will be referred to as a data value in the following discussion, since it can correspond to a weight value, a parameter value, or a distance value. Bus 414 preferably contains one such conductor corresponding to each bit of a value stored in one of the registers in the memory 402. Similarly, the buses 416, 418, and 420 used to couple a value from the parameter register 404, weight register 406, and distance register 408, respectively, each preferably contains one conductor per bit. In addition, each of these buses will, in general, have one or more conductors for specifying whether a parameter coupled to said bus is to be written into the register in question or read from said register. For the purposes of this discussion it is sufficient to note that each of these buses preferably includes one conductor per bit and that a value may be transferred from one bus to another by coupling the corresponding conductors of the buses in question in a manner analogous to that described with reference to FIG. 3, above. For simplicity, the individual conductors in the buses in question are not shown, since suitable bus configurations will be apparent to those skilled in the art from the discussions of the other embodiments of the present invention.

In addition, each storage section 400 also includes a flag 422 which is used in a manner analogous to the flags discussed with reference to the other embodiment of the present invention. The flag 422 specifies one of two states, active or inactive, for the storage section 400 in question The flag 422 controls a switch 426 which interrupts a select line 428 when said flag indicates the active state for the storage section 400 The flag 422 may be set to indicate the active state by a signal on a conductor 429 which is coupled to one of the conductors in bus 414 which is used to transmit control signals between the storage sections and the controller. The flag 422 may be reset by a signal on a conductor 430 which is generated by the processor 412 in response to processing operations which will be discussed in more detail below. The first storage section in the content addressable memory which has a flag specifying the active state is sensed by an AND gate 432 which detects a signal on the select line 428 in coincidence with a signal from the flag 422. The output of AND gate 432 is one of the inputs to the processor 412. The first storage section with a flag set to indicate the active state will be referred to as the first active storage section.

Processor 412 carries out a number of processing operations. Each operation is specified by one or more control signals on bus 414, the state specified by the flag 422, and the output of AND gate 432. The operations may be divided into three classes of instructions. The first class of instructions are used to initialize the content addressable memory prior to a pattern matching operation. This class of instructions includes an instruction for causing the distance register 408 in each storage section 400 to be set to a specified value, preferably zero, and an instruction for setting the flag 422 in each storage section 400 to indicate the active state for the storage section 400 in question.

The second class of instructions are used to write data into the memories 402 and to read data from the memories 402. These instructions operate in a manner analogous to the manner in which the read and write instructions described with reference to the other embodiments of the present invention operate. The data is transferred one value at a time. The processor 412 performs the transfer by coupling the appropriate data bus, 416, 418, or 420, to the conductors in the bus 414 which are transfer data values. The location in the memory 402 at which the data value is either read or written is specified by signals to the pointers 410 on a pointer bus 411 which is coupled to a corresponding set of conductors in bus 414 and by the particular input/output instruction being executed. Separate input/output instructions are used to read data from or write data into each of the possible registers 404 and 406. The specific instruction determines whether the storage location specified by the pointer 410 is in the parameter register 404 or weight register 406. The input instructions include instructions for reading a value into the specified location in all active storage sections or into only the location in question in the first active storage section. The output instructions include only instructions for reading a value from the specified location in the first active storage section. These instructions are functionally equivalent to those described with reference to the above described embodiments of the present invention. They differ from those described with reference to the embodiment shown in FIG. 3 only in that they require a register to be specified in addition to a storage location relative to the beginning of each register.

In addition to the read and write instructions, this set of instructions also contains a reset first active instruction which causes the flag in the first active storage section to be set to indicate the inactive state. This instruction is typically used select the next active storage section after a read or write operation directed to the first active storage section.

This second set of instructions also include instructions for causing the pointer 410 to specify specific locations in the registers in the memory 402. These instructions are analogous to the instructions used to control the pointer in the embodiments of the present invention described above. In the preferred embodiment, two instructions are implemented. The first instruction is a reset pointer instruction which causes the pointer to specify the first storage location in each of the registers. The second instruction is an increment pointer instruction which causes the pointer 410 to indicate the next sequential storage location in each of the registers in question. Embodiments in which bus 414 includes "address lines" for specifying the storage locations in question and in which each memory 402 includes circuitry for decoding these address lines will be apparent to those skilled in the art.

In this preferred embodiment of the present invention, the third set of instructions perform mathematical operations or other operations on data consisting of the parameter value stored in the specified location in the parameter register 404, the weight value stored in the specified location in the weight register 406, the data value on the bus 414 and the contents of the distance register 408. The flag 422 may be reset as a consequence of one or more of these instructions being executed. The first instruction in this set, referred to as "multiply" computes one of the terms in the sum shown in Eq. (1). The processor 412 computes the difference of the data value and parameter value in question, squares the resultant value, multiplies the result of the squaring operation by the weight value, and then adds the result to the value in the distance register 410. The final result is stored in the distance register 408. This instruction is performed simultaneously in each storage section 400 in response to a predetermined control signal on bus 414 regardless of the state of the flag in said storage section. This instruction does not affect the flag 422.

The second instruction in this set, referred to as the distance reset instruction, is used to reset the flag 422 if the value in the distance register 408 is greater than the data value communicated on bus 414. This instruction is used to reset the flags 422 in all storage sections 400 which contained a pattern which was "too far" from the unknown pattern communicated during a previous series of multiply instructions.

These three sets of instructions are sufficient to match an unknown pattern to a set of known patterns and select those known patterns which are close to the unknown pattern as measured by the distance function given in Eq. (1). It will be assumed that the registers 404 and 406 are comprised of memory cells which may be both read and written. In this case, the content addressable memory must be initialized with the known patterns before such matching can take place. This is accomplished in a manner analogous to that described with reference to content addressable memory shown in FIG. 3. The parameter register 404 and weight register 406 are first filled with "blank" parameters and weights respectively. This is accomplished by writing a parameter of zero in each parameter location in each storage section 400 and a weight value of zero in each corresponding weight location using the write instructions. First, all of the storage sections 400 are made active by setting the flag 422 in each storage section 400 using the set flags instruction. Next, the pointer 410 in each storage section 400 is set to specify the first storage location in each register. A write instruction directed to the parameter register 404 in all active storage sections 400 is then given with a data value of zero. This is followed by a write instruction directed to the weight register in all the active storage sections with a data value of zero. The pointer 410 is then incremented to specify the next storage location in each of the registers 404 and 406 using an increment pointer instruction. These two write instructions and the increment pointer instruction are repeated until each register in the content addressable memory is loaded with zeros. It is assumed that all of the registers 404 and 406 have the same number of storage locations, N. Hence, N sets of write and increment instructions must be given. Embodiments in which different storage sections have different length registers will be apparent to those skilled in the art. The methods described above with reference to the other embodiments of the present invention which employed memories having different numbers of storage locations may be used to accomodate registers of different lengths in this embodiment.

Once the content addressable memory has been cleared, one or more initial patterns may be loaded into it in a manner analogous to that described with reference to clearing the content addressable memory. However, instead of writing a data value of zero in each storage location of registers 404 and 406 in all of the active storage sections, the parameter and corresponding weight values are written into only the first active storage section. This is accomplished by first positioning the pointer 410 to specify the first storage location in registers 404 and 406 using a reset pointer instruction. Each parameter and its corresponding weight are then read into successive locations in registers 404 and 406. This is accomplished in three steps. First, a write instruction containing a data value representing the parameter in question is directed to the parameter register 404 in the first active storage section. This is followed by a similar write instruction containing a data value representing the weight value in question directed to the weight register 406 in the first active storage section. Finally, an increment pointer instruction is given to position the pointer 410 to specify the next sequential location in registers 404 and 406. When the writing of the pattern and weight function is completed, a reset first active instruction is used to select the next storage section 400.

Once the initial patterns have been read into the content addressable memory, one or more patterns which are "close" to an unknown pattern may be retrieved in a manner analogous to that described with reference to retrieving data words which matched a specification word. First, the content addressable memory is initialized for the matching operation by setting all of the flags to indicate the active state and storing zero in all of the distance registers 408 using the first group of instructions described above. The distance from the unknown pattern to each of the stored patterns is then calculated by giving a series of multiply instructions. First the pointers 410 are set to indicate the first storage location in registers 404 and 406 using a reset pointer instruction. Next, a multiply instruction is given with a data value equal to the first parameter of the unknown pattern. The pointers 410 are then incremented and another multiply instruction having a data value equal to the second parameter of the unknown pattern is then given. This is repeated until all of the parameters of the unknown pattern have been sent to the content addressable memory in multiply instructions. After the last parameter has been sent, flags 422 in those storage sections 400 in which the distance register 408 contains a value greater than a predetermined value are reset by using the distance reset instruction with a data value equal to said predetermined value. The patterns in the remaining storage sections 400 may then be read out in the manner described with reference to the embodiments of the content addressable memory described with reference to FIG. 3 above.

In embodiments of the present invention in which the distance register 408 contains more than one storage location, the pointers 410 may be reset by using a multicharacter comparison operation similar to that described above with reference to embodiments of the present invention using numerical comparison instructions.

A given pattern can be erased from the content addressable memory by marking the storage section 400 containing the pattern in question and then writing a blank pattern consisting of parameters and weights which are zero. The storage section 400 in question is marked by matching the contents of the content addressable memory to the pattern in question as described above. A distance reset instruction with a data value of zero is then given to reset the flags in all of the storage sections 400 which do not contain a pattern which exactly matched the pattern in question. The blank pattern is then written using the appropriate write instructions directed to the first active storage section.

Similarly, a new pattern may be placed in the content addressable memory at any time by first matching the contents of the content addressable memory to the blank pattern and then writing the new parameter and its weights into the first active storage section.

Although the instructions described above are adequate to perform the necessary operations in this embodiment of the present invention, additional instructions which improve the speed of operation will be apparent to those skilled in the art. For example, a compare instruction as described with reference to the embodiments of the present invention shown in FIG. 3 would increase the speed with which storage sections which contain patterns which exactly match the unknown pattern could be marked. In the above examples, a series of multiply instructions followed by a distance reset instruction with a data value of zero were used for this purpose. A multiply instruction requires a significantly longer time to execute than a simple compare instruction. Hence, a significant improvement in processing speed is obtained by including the compare instruction.

The above examples assumed a memory in which storage registers 404 and 406 could be both read and written. Embodiments in which these storage sections contain read only memory or other forms of memory cells will be apparent to those skilled in the art from the discussion of the other embodiments of the present invention which employ such memory cells.

It will also be apparent to those skilled in the art that in those pattern matching problems in which the various parameters have equal weights, the weight register 406 may be omitted. In this case, the multiplication by the weight value in the multiply instruction is also omitted.

It will also be apparent to those skilled in the art that each pattern may contain a "parameter" which is used to identify the pattern in question or provide other information relative to said pattern. The parameter is stored in the parameter register; however, it is not used in the actual pattern matching. That is, the parameter register location in which it is stored is never selected during the matching processes. When a pattern is to be read out, this parameter is read out instead. Since the parameter is chosen so as to uniquely identify the pattern in question, the remainder of the pattern need not be read out. This saves a significant amount of read out time.

It will also be apparent to those skilled in the art that this pattern matching content addressable memory differs from the other embodiments of the present invention only in that it includes two additional storage means in each memory 402 and some additional instructions needed to implement the distance measurement given in Eq. (1) and to direct data to and from the additional storage means. The pattern register 404 is essentially a data word register in which each storage location stores a character having a numerical value equal to one of the parameter values. The additional registers 406 and 408 may be considered to be part of the processor 412. Hence, the pattern matching content addressable memory is another embodiment of the present invention in which the processor is somewhat more complicated. As such, the various modifications and embodiments of the basic content addressable memory described with reference of FIG. 3 are all equally applicable to this pattern matching embodiment.

In particular, the numerical comparision instructions described with reference to the other embodiments of the present invention may be used to accomodate distance registers having more than one storage location. In such cases, the distance register 408 may be regarded as a "multi-digit" number in which each storage location is used to store the value of one such digit. The value in the distance register may then be treated exactly as the values in the data words described above with reference to the numerical comparison instructions provided the circuitry used to implement said numerical comparison has the distance register as one of its inputs. In this case, the distance reset instruction is replaced by the reset flag if greater than instruction described with reference to the other embodiments of the present invention using the numerical comparison instructions.

The above embodiments of the present invention have also been described with reference to a controller for decoding the various instructions and placing the appropriate signal levels on the signal lines in the various buses. Finite state machines for carrying out this type of control function are well known to those skilled in the art of computer design, and, hence, specific controller designs have not been presented.

It should be noted, however, that the host data processing system can provide the control functions in question. In this case, the each of the signal lines in bus 26 shown in FIG. 3 and the subsequent figures would be connected to a corresponding bit of an output port of the host computer The data lines 66 would be connected to a bidirectional port for communicating characters between the host data processing system and the present invention. One additional input line would be used for sensing the end of the select line. The beginning of the select line may be permanently wired to an appropriate power supply potential. In such an embodiment, the host data processing system places the appropriate signal levels on the bus lines by writing characters to the various output ports.

Various modifications to the present invention will become apparent to those skilled in the art from the foregoing description and accompanying drawings. Such modifications are intended to fall within the scope of the appended claims.

What is claimed is:

1. A content addressable memory for storing a plurality of data words and selectively retrieving specified said data words in response to a specification word comprising a plurality of specification characters, said content addressable being adapted for use in a host data processing system, said content addressable memory comprising:

a plurality of storage sections; and control bus means for coupling each said storage section to the other said storage sections and to said host data processing system, said control bus means including means for coupling a plurality of control signals to each said storage section and means for coupling a said specification character comprising W binary bits to each said storage section, wherein W is greater than 2 and wherein each said storage section comprises:

data word storing means for storing a said data word comprising a plurality of characters, each said character comprising W binary bits, the number of said characters being greater than 2, said storing means including means for separately selecting each character in said data word, the character so selected being determined by a first one of said control signals;

flag means for specifying one of two states, active or inactive, for said storage section; and processing means for causing said flag means to specify one of said two states operative in response to said control signals, said specification character, and said selected character, said processing means including:

means for causing said flag means to specify the active state for said storage section operative in response to a second one of said control signals; and reset means for causing said flag means to specify the inactive state for said storage section operative in response to a third one of said control signals and a specified relationship between said specification character and said selected character, wherein, said bus means further comprises means for determining if any of said flag means specifies the active state, said determining means including means for generating a signal if any of said flag means specifies the active state.

2. The content addressable memory of claim 1 wherein said reset means comprises comparing means for causing said flag means to indicate the inactive state for said storage section if said specification character does not match said selected character.

3. The content addressable memory of claim 1 wherein each means for selecting a character further comprises:

means for determining the position of said selected character relative to the first character of said stored data word; and means for storing information specifying the maximum number of characters which may be stored in said data word storing means, and wherein said reset means further comprising overflow means for causing said flag means to specify the inactive state for said storage section if the position of said selected character relative to the beginning of said stored data word is greater than said maximum number of characters, said reset means being responsive to a fourth one of said control signals.

4. The content addressable memory of claim 1 wherein each said means for selecting a character further comprises:

means for determining the position of said selected character relative to the first character of said stored data word;

means for storing information specifying the maximum number of characters which may be stored in said data word storing means; and means for causing said selected character to comprise a predetermined character if said determined position is greater than said maximum number of characters in said storage section.

5. The content addressable memory of claim 1 wherein said plurality of storage sections are organized as a linearly ordered array having a first storage section, a last storage section, one or more intermediate storage sections, each said storage section further including path means comprising:

means for receiving a signal from the adjacent storage section closest to said first storage section in said linearly ordered array of storage sections, and means for coupling said received signal to the receiving means of the adjacent storage section closest to said last storage section of said linearly ordered array of storage sections if said storage section is not in the active state, said means for determining if any of said flag means specify the active state comprising:

means for coupling a signal to the receiving means of said first storage section; and means for detecting a signal from the coupling means of said last storage section.

6. The content addressable memory of claim 1 wherein said data word storage means comprises:

shift register means comprising:

means for receiving a shift signal; and register means comprising an ordered array of storage locations, one said storage location for storing each character of said stored data word, each said storage location including input means for receiving signals specifying a character to be stored therein upon the receipt of said shift signal and an output means for coupling signals specifying the character stored therein upon receipt of said shift signal; the input means of each storage location being operatively coupled to the output means of the preceding storage location, except for the last said storage location in which the input means is coupled to the output means of the first storage location, and wherein said mean for specifying a character of said data word specifies the character stored in a predetermined one of said storage locations, said predetermined storage location being operatively coupled to said processing means.

7. The content addressable memory of claim 1 wherein said data word storage means comprises:

random access storage means comprising a plurality of storage locations, one character of said data word being stored in each said storage location, each said storage location comprising means for storing W binary bits; pointer means for selecting one of said storage locations, said selected storage location being determined by a storage control signal comprising one of said control signals; and coupling means for coupling the storage location selected by said pointer means to said processing means.

8. The content addressable memory of claim 7 wherein said storage locations are arranged in a predetermined order and said pointer means includes means, responsive to a reset memory signal comprising one of said control signals, for selecting the first said storage location and means for selecting the next sequential storage location relative to the currently selected storage section, said means being responsive to an increment memory control signal comprising one of said control signals.

9. The content addressable memory of claim 7 wherein said coupling means for coupling the storage location specified by said pointer means to said processing means comprises:

data bus means for coupling said selected storage location to said processing means, said data bus means comprising a plurality of data bus conductors, each said data bus conductor being used to couple a signal corresponding to one of said binary bits to said processing means.

10. The content addressable memory of claim 9 wherein said control bus means includes specification character coupling means for coupling said specification character to each said processing means, said specification character coupling means comprising a plurality of conductors, one said conductor corresponding to each of said data bus conductors in said data bus means.

11. The content addressable memory of claim 10 wherein said processing means further comprises means for comparing the signal on each data bus conductor in said data bus means to the signal on the corresponding conductor in said specification character coupling means; and said reset means comprises means for causing said flag means to specify the inactive state for said storage section if the signal on one of said data bus conductors does not match the signal on the corresponding conductor in said specification character coupling means.

12. The content addressable memory of claim 10 wherein each of said storage locations comprises a storage location conductor and a plurality of storage links for selectively coupling a potential to selected ones of said data bus conductors if a predetermined potential is present on said storage location conductor, said selected data bus conductors being determined by whether or not the corresponding binary bit in said stored character is a "1", said storage link allowing a current to flow in only one direction between said storage location conductor and said selected data bus conductors, wherein said pointer means comprises means for coupling said predetermined potential to the storage location conductor corresponding to said selected character, and wherein said processing means further comprises means for sensing a potential on each of said data bus conductors.

13. The content addressable memory of claim 12 wherein each said storage link comprises a diode connecting said storage location conductor to one of said selected data bus conductors.

14. The content addressable memory of claim 10 wherein each of said storage locations comprises a storage location conductor and a plurality of storage links, each said storage link coupling said storage location conductor to one of said data bus conductors, each said storage link comprising a two terminal circuit comprising a fuse link in series with a diode means for restricting the flow of current in said two terminal circuit to one direction, one of said terminals being coupled to said storage location conductor and the other of said terminals being coupled to one of said data bus conductors, said fuse link having two states, a closed state in which said fuse link will pass a current in response to a potential applied across said fuse link and an open state in which said fuse link will not pass a current, said fuse link being in the closed state in those storage links which couple said storage location conductor to a data bus conductor corresponding to a binary bit having a first binary value in the character stored in said storage location, and in the open state in all other storage links, and wherein said pointer means comprises means for coupling a predetermined potential to the storage location conductor in the selected storage location, and wherein said processing means includes means for sensing a potential on each of said data bus conductors.

15. The content addressable memory of claim 1 wherein said plurality of storage sections are organized as a linearly ordered array beginning with a first storage section, ending with a last storage section, and having one or more intermediate storage sections, each said storage section further comprising:

first active means for determining if said storage section is the first storage section having a flag means specifying the active state relative to the beginning of said linearly ordered array, said first active means including means for generating a first active signal in response to said determination, and readout means for coupling response signals specifying said selected character to said control bus means, said readout means being responsive to said first active signal and a fourth one of said control signals.

16. The content addressable memory of claim 15 wherein each said flag means further comprising disconnect means, responsive to a disconnect signal coupled to said storage section on said control bus means and said first active signal, for specifying a disconnected state for said storage section, said disconnected state being specified by the coincidence of said first active signal and first disconnect signal, wherein when said disconnected state is specified for said storage section, said flag means specifies the inactive state for said storage section.

17. The content addressable memory of claim 15 wherein said flag means comprises first and second one bit memory cells and a two input AND circuit, each said memory cell providing a "false" output when a "0" is stored therein, said first memory cell including means for storing a "1" in said memory cell operative in response to said first control signal and means for storing a "0" in said memory cell operative in response to said reset means, said second one bit memory cell including means for storing a "0" therein operative in response to the coincidence of said first active signal and said first disconnect signal, the inputs of said two input AND gate being the outputs of said first and second memory cells, said AND gate generating a "true" output if both said inputs are "1" and a "true" output of said two input AND gate comprising a signal indicating that said storage section is in the active state.

18. The content addressable memory of claim 17 further comprising means for causing said second one bit memory cell to store a "1" operative in response to a second disconnect signal being coupled to said storage section.

19. The content addressable memory of claim 17 wherein said second one bit memory cell comprises a fuse link.

20. The content addressable memory of claim 17 wherein said second one bit memory cell comprises an electrically programmable read-only memory cell.

21. The content addressable memory of claim 15 wherein said first active means comprises:

path means comprising means for receiving a signal from the adjacent storage section closest to said first storage section in said linearly ordered array of storage sections, and means for coupling said received signal to the receiving means of the adjacent storage section closest to said last storage section of said linearly ordered array of storage sections if said storage section is not in the active state, said content addressable memory further comprises means for coupling a signal to the receiving means of said first storage section;

said first active means in each said storage section comprises:

means for detecting a signal on the receiving means of said path means in coincidence with said flag means specifying the active state for said storage section, and said means for determining if any of said flag means specify the active state comprises means for detecting a signal from the coupling means of said last storage section.

22. The content addressable memory of claim 21 wherein said content addressable memory further comprising:

by-pass means for coupling the receiving means of the path means of said first storage section to the receiving means of the path means of the storage section determined to be the first storage section having a flag means specifying the active state relative to said first last storage section.

23. The content addressable memory of claim 22 wherein said by-pass means comprises:

a conductor coupled to the receiving means of said first storage section; and gate means in each said storage section for coupling the coupling means of the path means of said storage section to said conductor if a predetermined signal is coupled to the receiving means of said storage section and the flag means in said storage section indicates the inactive state for said storage section.

24. The content addressable memory of claim 15 wherein said data word storage means comprises:

shift register means comprising:

means for receiving a shift signal; and register means comprising an ordered array of storage locations, one said storage location for storing each character of said stored data word, each said storage location including input means for receiving signals specifying a character to be stored therein upon the receipt of said shift signal and an output means for coupling signals specifying the character stored therein upon receipt of said shift signal; the input means of each storage location being operatively coupled to the output means of the preceding storage location, except for the last said storage location in which the input means is coupled to the output means of the first storage location, and wherein said mean for selecting a character of said data word specifies the character stored in a predetermined one of said storage locations, said predetermined storage location being operatively coupled to said processing means and said readout means.

25. The content addressable memory of claim 15 wherein said data word storage means comprises:

random access storage means comprising a plurality of storage locations, one character of said data word being stored in each said storage location, each said storage location comprising means for storing W binary bits; pointer means for selecting one of said storage locations, said selected storage location being determined by a storage control signal comprising one of said control signals; and coupling means for coupling the storage location selected by said pointer means to said processing means and said readout means.

26. The content addressable memory of claim 25 wherein said storage locations are arranged in a predetermined order and said pointer means includes means, responsive to a reset memory signal comprising one of said control signals, for selecting the first said storage location and means for selecting next sequential storage location relative to the currently selected storage section, said means being responsive to an increment memory control signal comprising one of said control signals.

27. The content addressable memory of claim 25 wherein said coupling means for coupling the storage location specified by said pointer means to said processing means and said readout means comprises:
   data bus means for coupling said selected storage location to said processing means and said readout means, said data bus means comprising a plurality of data bus conductors, each said data bus conductor being used to couple a signal corresponding to one of said binary bits to said processing means and said readout means.

28. The content addressable memory of claim 27 wherein said specification character coupling means includes a plurality of conductors, one said conductor corresponding to each of said data bus conductors in said data bus means.

29. The content addressable memory of claim 28 wherein said processing means further comprises means for comparing the signal on each data bus conductor in said data bus means to the signal on the corresponding conductor in said specification character coupling means and means for causing said flag means to specify the inactive state for said storage section if the signal on one of said data bus conductors does not match the signal on the corresponding conductor in said specification character coupling means.

30. The content addressable memory of 28 wherein said readout means comprises a plurality of gate means for coupling each of said data bus conductors to the corresponding conductor in said specification character coupling means, each said gate means being responsive to the coincidence of said first active signal and a readout control signal comprising one of said control signals.

31. The content addressable memory of claim 28 wherein each of said storage locations comprises a storage location conductor and a plurality of storage links for selectively coupling a potential to selected ones of said data bus conductors, if a predetermined potential is present on said storage location conductor, said selected data bus conductors being determined by whether or not the corresponding binary bit in said stored character is a "1", said storage link allowing a current to flow in only one direction between said storage location conductor and said selected data bus conductors,
   wherein said pointer means comprises means for coupling said predetermined potential to the storage location conductor corresponding to said selected storage location, and
   wherein said processing means further comprises means for sensing a potential on each of said data bus conductors 32. The content addressable memory of claim 31 wherein each said storage link comprises a diode connecting said storage location conductor to one of said selected data bus conductors.

33. The content addressable memory of claim 28 wherein each of said storage locations comprises a storage location conductor and a plurality of storage links, each said storage link coupling said storage location conductor to one of said data bus conductors, each said storage link comprising a two terminal circuit comprising a fuse link in series with a diode means for restricting the flow of current in said two terminal circuit to one direction, one of said terminals being coupled to said storage location conductor and the other of said terminals being coupled to one of said data bus conductors, said fuse link having two states, a closed state in which said fuse link will pass a current in response to a potential applied across said fuse link and an open state in which said fuse link will not pass a current, said fuse link being in the closed state in those storage links which couple said storage location conductor to a data bus conductor corresponding to a binary bit having a first binary value in the character stored in said storage location, and in the open state in all other storage links, and
   wherein said pointer means comprises means for coupling a predetermined potential to the storage location conductor corresponding to the selected storage location, and wherein said processing means includes means for sensing a potential on each of said data bus conductors.

34. The content addressable memory of claim 15 wherein each said storage section further comprises:
   means for selecting an input character comprising one of the characters of said stored data word, said input character selecting means being responsive to a fifth one of said control signals;
   means for generating an input signal operative in response to said first active signal and a sixth one of said control signals; and
   input means for causing said input character to match the character of said specification word coupled to said storage section on said control bus means, said input means being responsive to said input signal.

35. The content addressable memory of claim 34 wherein said first active means comprises:
   path means comprising for receiving a signal from the adjacent storage section closest to said first storage section in said linearly ordered array of storage sections, and means for coupling said received signal to the receiving means of the adjacent storage section closest to said last storage section of said linearly ordered array of storage sections if said storage section is not in the active state,
   wherein said content addressable memory further comprises means for coupling a signal to the receiving means of said first storage section;
   wherein said first active means in each said storage section comprises
   means for detecting a signal on the receiving means of said path means in coincidence with said flag means specifying the active state for said storage section, and
   wherein said means for determining if any of said flag means specify the active state comprises means for detecting a signal from the coupling means of said last storage section.

36. The content addressable memory of claim 34 wherein said data word storage means comprises:
   shift register means comprising:
   means for receiving a shift signal; and
   register means comprising an ordered array of storage locations including a first storage location, a last storage location, one said storage location for storing each character of said stored data word, each said storage location including input means for receiving signals specifying a character to be stored therein upon the receipt of said shift signal and an output means for coupling signals specifying the character stored therein upon receipt of said shift signal; the input means of each storage location being operatively coupled to the output means of the preceding storage location, the input means of said first storage location being operatively coupled to said input means and the output means of said last storage location being operatively coupled to said readout means;

wherein said mean for selecting a character of said data word specifies the character stored in said last storage location, the output means of said last storage location being operatively coupled to said processing means and said readout means, and wherein said input means comprises means for coupling the output means of said last storage location to the input means of said first storage location if said input signal is not generated and means for coupling signals specifying said specification character to the input means of said first storage location if said input signal is generated.

37. The content addressable memory of claim 34 wherein said data word storage means comprises:
random access storage means comprising
a plurality of storage locations, one character of said data word being stored in each said storage location, each said storage location comprising means for storing W binary bits;
pointer means for specifying one of said storage locations, said specified storage location being determined by a storage control signal comprising one of said control signals; and
coupling means for coupling the storage location specified by said pointer means to said processing means, said readout means, and said input means,
wherein said input means comprises means responsive to said input signal for causing the character stored in the storage location specified by said pointer means to match said specification character.

38. The content addressable memory of claim 37 wherein said storage locations are arranged in a predetermined order and said pointer means includes means, responsive to a reset memory signal comprising one of said control signals, for selecting the first said storage location and means for selecting next sequential storage location relative to the currently selected storage section, said means being responsive to an increment memory control signal comprising one of said control signals.

39. The content addressable memory of claim 37 wherein said coupling means for coupling the storage location specified by said pointer means to said processing means and said readout means comprises:
data bus means for coupling said selected storage location to said processing means, said readout means, and said input means, said data bus means comprising a plurality of data bus conductors, each said data bus conductor being used to couple a signal corresponding to one of said binary bits to said processing means, said readout means, and said input means.

40. The content addressable memory of claim 39 wherein said specification character coupling means includes a plurality of conductors, one said conductor corresponding to each of said data bus conductors in said data bus means.

41. The content addressable memory of 40 wherein said processing means further comprises means for comparing the signal on each data bus conductor in said data bus means to the signal on the corresponding conductor in said specification character coupling means and means for causing said flag means to specify the inactive state for said storage section if the signal on one of said data bus conductors does not match the signal on the corresponding conductor in said specification character coupling means.

42. The content addressable memory of claim 40 wherein said readout means comprises a plurality of gate means for coupling each of said data bus conductors to the corresponding conductor in said specification character coupling means, each said gate means being responsive to the coincidence of said first active signal and a readout control signal comprising one of said control signals.

43. The content addressable memory of claim 40 wherein each of said storage locations comprises a storage location conductor and a plurality of storage links, each said storage link coupling said storage location conductor to one of said data bus conductors, each said storage link comprising a two terminal circuit comprising a fuse link in series with a diode means for restricting the flow of current in said two terminal circuit to one direction, one of said terminals being coupled to said storage location conductor and the other of said terminals being coupled to one of said data bus conductors, said fuse link having two states, a closed state in which said fuse link will pass a current in response to a potential applied across said fuse link and an open state in which said fuse link will not pass a current, said fuse link being in the closed state in those storage links which couple said storage location conductor to a data bus conductor corresponding to a binary bit having a first binary value in the character stored in said storage location, and in the open state in all other storage links, each said fuse link irreverseably changing from a first state comprising one of said open and closed states to a second state comprising the other of said open and closed states when a current greater than a predetermined current passes through said fuse link, and wherein said pointer means comprises means for coupling one of two predetermined potentials to the storage location conductor in the selected storage location, said first predetermined potential being sufficient to cause a current greater than said predetermined current to pass through said fuse link if said fuse link is in said first state and said readout means couples the data bus conductor connected to the storage link containing said fuse link to a grounded conductor, and said second predetermined potential is insufficient to cause a current greater than said predetermined current to flow in said fuse link when said fuse link is in said first state and said readout means couples the data bus conductor connected to the storage link containing said fuse link to a grounded conductor, said first predetermined potential being coupled to said storage location conductor in response to said input signal and said second predetermined potential being coupled to said storage location conductor at all other times.

44. The content addressable memory of 15 wherein an order is defined for the characters stored in said content addressable memory, said order defining comparison relationships between said characters such that a first given character may be less than, equal to, or greater than a second given character and wherein said processing means further comprises:
   compare state means for specifying three states, greater than, less than, and equal, for said storage section including means responsive to a compare reset control signal comprising one of said control signals for causing said compare state means to specify the equal state for said storage section;
   ordered comparing means for comparing said specification character to said selected character, for causing said said compare state means to specify the greater than state for said storage section if said storage section was in the equal state and said selected character was greater than said character of said specification word, and for causing said compare state means to specify the less than state for said storage section if said storage section was in the equal state and said selected character was less than said character of said specification word, said ordered comparing means being responsive to a numerical compare control signal comprising one of said control signals;
   means for causing said flag means to specify the inactive state for said storage section if said compare state means specifies the greater than state for said storage section, said means being responsive to a reset if greater than control signal comprising one of said control signals;
   means for causing said flag means to specify the inactive state for said storage section if said compare state means specifies the less than state for said storage section, said means being responsive to a reset if less than control signal comprising one of said control signals; and
   means for causing said flag means to specify the inactive state for said storage section if said compare state means specifies the equal state for said storage section, said means being responsive to a reset if equal control signal comprising one of said control signals.

45. The content addressable memory of claim 44 wherein said processing means further comprising means for causing said flag means to specify the inactive state for said storage section if said compare state means specifies the greater than state for said storage section, said means being responsive to a reset if greater than control signal comprising one of said control signals;

46. The content addressable memory of 44 wherein said ordered comparing means comprises means for comparing the numerical representation of said specification character to the numerical representation of said selected character.

47. The content addressable memory of 15 wherein each said storage section further comprising:
   distance means for storing a number;
   means for storing a predetermined number in said distance means operative in response to a distance register reset signal comprising one of said control signals;
   means for computing a function value depending on said selected character and said specification character and for adding the said function value to the number stored in said distance mean operative in response to a distance calculating signal comprising one of said control signals; and
   reset means for causing said flag means to specify the inactive state for said storage section if the number stored in said distance means has a specified numerical relationship to a number comprising a specification character communicated on said control bus, said reset means being responsive to a distance compare signal comprising one of said control signals.

48. The content addressable memory of claim 47 wherein said reset means comprises means for causing said flag to be specify the inactive state if the number stored in said distance means is greater than said the number comprising said specification character.

49. The content addressable memory of claim 47 wherein said reset means comprises means for causing said flag to be specify the inactive state if the number stored in said distance means is greater than or equal to said the number comprising said specification character.

50. The content addressable memory of claim 47 wherein said reset means comprises means for causing said flag to be specify the inactive state if the number stored in said distance means is less than to said the number comprising said specification character.

51. The content addressable memory of claim 47 wherein said function value depends on the difference of the numerical representation of said selected character and the numerical representation of said specification character.

52. The content addressable memory of claim 47 wherein each said storage section further comprises means for storing a plurality of character weights, one such character weight corresponding to each character of the data word stored in said storage section and wherein said function value depends on the selected character, the character weight corresponding to said character and the specification character.

53. The content addressable memory of claim 52 wherein said function value depends on the product of said character weight and the difference of the numerical representation of said selected character and the numerical representation of said specification character.

54. The content addressable memory of claim 34 wherein said storage means further comprising means for storing a scratch character and means for selecting said scratch character, said selecting means including means for coupling said scratch character to said processing means operative in response to a scratch character coupling signal comprising one of said control signals.

55. The content addressable memory of claim 54 wherein said means for storing a scratch character comprises one storage location normally used for storing a character of a data word.

* * * * *